United States Patent
Lee et al.

(10) Patent No.: US 11,551,683 B2
(45) Date of Patent: Jan. 10, 2023

(54) ELECTRONIC DEVICE AND OPERATION METHOD THEREFOR

(71) Applicant: Samsung Electronics Co., Ltd., Gyeonggi-do (KR)

(72) Inventors: Yo-Han Lee, Gyeonggi-do (KR); Jung-Kyun Ryu, Gyeonggi-do (KR); Jun Ho Park, Seoul (KR); Won-Sik Song, Seoul (KR); Jong Chan Won, Gyeonggi-do (KR); Seungyong Lee, Gyeonggi-do (KR); Young-Su Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 207 days.

(21) Appl. No.: 16/756,894

(22) PCT Filed: Oct. 16, 2018

(86) PCT No.: PCT/KR2018/012202
§ 371 (c)(1),
(2) Date: Apr. 17, 2020

(87) PCT Pub. No.: WO2019/078588
PCT Pub. Date: Apr. 25, 2019

(65) Prior Publication Data
US 2020/0265838 A1    Aug. 20, 2020

(30) Foreign Application Priority Data
Oct. 17, 2017  (KR) .................. 10-2017-0134571

(51) Int. Cl.
*G10L 15/00*   (2013.01)
*G10L 21/00*   (2013.01)
(Continued)

(52) U.S. Cl.
CPC ............ *G10L 15/22* (2013.01); *G06F 1/3231* (2013.01); *G06F 1/3287* (2013.01); *G10L 25/51* (2013.01); *G10L 2015/223* (2013.01)

(58) Field of Classification Search
USPC ...................................... 704/1–277
See application file for complete search history.

(56) References Cited

U.S. PATENT DOCUMENTS 9,466,286 B1 * 10/2016 Hart .................. G10L 15/10
9,558,758 B1    1/2017 Piersol et al.
(Continued)

FOREIGN PATENT DOCUMENTS

KR    10-2004-0042242 A    5/2004
KR       10-1116487 B1     3/2012
(Continued)

OTHER PUBLICATIONS

Korean Search Report dated Dec. 21, 2021.
Notice of Final Rejection dated Jun. 22, 2022.

*Primary Examiner* — Marcellus J Augustin
(74) *Attorney, Agent, or Firm* — Cha & Reiter, LLC

(57) ABSTRACT

Various embodiments of the present invention pertain to an electronic device and an operation method therefor. The electronic device comprises: a housing that includes a circular upper end surface comprising a plurality of openings having a selected pattern, a flat circular lower end surface and a side surface surrounding a space between the upper end surface and the lower end surface; an audio output interface that is formed on the side surface; a power input interface that is formed on the side surface; a microphone that is located inside the housing, and that faces the openings; a wireless communication circuit; a processor that is operatively connected to the audio output interface, the power input interface, the microphone and the communication circuit; and a memory that is operatively connected to
(Continued)

the processor, wherein the memory, when the electronic device is executed, can store instructions for the processor to receive a wake-up command through the microphone, to recognize the wake-up command, to transmit to a server information regarding reception of the wake-up command using the communication circuit, to receive a response from the server using the communication circuit, to generate a first audio signal based on the response, and to output the first audio signal using the audio output interface when the microphone is available, wherein the audio signal can be a non-language sound. Various embodiments are also possible.

16 Claims, 20 Drawing Sheets

(51) Int. Cl.
*G06F 1/26* (2006.01)
*G10L 15/22* (2006.01)
*G06F 1/3231* (2019.01)
*G06F 1/3287* (2019.01)
*G10L 25/51* (2013.01)

(56) References Cited

U.S. PATENT DOCUMENTS

| | | | |
|---|---|---|---|
| 10,931,999 B1* | 2/2021 | Jobanputra | H04N 21/835 |
| 2004/0093219 A1 | 5/2004 | Shin et al. | |
| 2010/0020983 A1 | 1/2010 | Waites | |
| 2012/0053715 A1 | 3/2012 | McKillop et al. | |
| 2015/0245154 A1 | 8/2015 | Dadu et al. | |
| 2016/0240194 A1 | 8/2016 | Lee et al. | |
| 2016/0253997 A1 | 9/2016 | Kerr | |
| 2016/0302008 A1* | 10/2016 | Oishi | H04R 3/04 |
| 2017/0025124 A1* | 1/2017 | Mixter | G10L 15/22 |
| 2017/0201882 A1 | 7/2017 | O'Gorman et al. | |
| 2017/0372703 A1* | 12/2017 | Sung | G06Q 10/0631 |
| 2018/0122378 A1* | 5/2018 | Mixter | H04L 12/282 |
| 2018/0182388 A1* | 6/2018 | Bocklet | G10L 15/02 |

FOREIGN PATENT DOCUMENTS

| | | | | |
|---|---|---|---|---|
| KR | 101116487 B1 | | 3/2012 | |
| KR | 10-2016-0100765 A | | 8/2016 | |
| KR | 1020160100765 A | | 8/2016 | |
| KR | 1020160110085 A | | 9/2016 | |
| KR | 10-2017-0021802 A | | 2/2017 | |
| KR | 1020170093629 A | | 8/2017 | |
| WO | WO2017111319 | * | 6/2017 | G06F 3/165 |

* cited by examiner

ELECTRONIC DEVICE AND OPERATION METHOD THEREFOR

CROSS-REFERENCE TO RELATED APPLICATION(S)

This application is a National Phase Entry under 35 U.S.C. § 371 of PCT International Application No. PCT/KR2018/012202, which was filed on Oct. 16, 2018, and claims priority to Korean Patent Application No. 10-2017-0134571, which was filed in the Korean Intellectual Property Office on Oct. 17, 2017, the entire contents of each of which are incorporated herein by reference.

TECHNICAL FIELD

Various embodiments of the disclosure relate to an electronic device and a method for operating the same and, more particularly, to a device and a method for providing a voice recognition service.

BACKGROUND ART

Electronic devices may provide various services in order to enhance user convenience. For example, electronic devices may provide various multimedia services such as a broadcasting service, a wireless Internet service, a camera service, and a voice playback service.

Electronic devices recently provide not only multimedia services, but also various voice recognition services based on voice recognition technology. For example, electronic devices may provide various kinds of information (for example, information such as weather and news) according to the user's voice commands, or may perform specific functions (for example, music playback, memos, telephone connection, and the like) according to the user's voice commands.

DISCLOSURE OF INVENTION

Technical Problem

In the case of an electronic device providing a voice recognition service, the quality of the voice recognition service may be limited due to the limited performance of the audio output device (for example, speaker) provided in the electronic device. In addition, the fact that the electronic device needs to be equipped with a speaker also causes problems in that the volume of the electronic device increases, the manufacturing cost thereof increases, and the amount of power consumed by the electronic device increases.

Various embodiments of the disclosure provide a method for providing a voice recognition service through an electronic device that can be connected to a separate audio output device.

Solution to Problem

According to various embodiments of the disclosure, an electronic device may include: a housing including a circular upper end surface including multiple openings having a selected pattern, a flat circular lower end surface, and a side surface surrounding a space between the upper end surface and the lower end surface; an audio output interface formed on the side surface; a power input interface formed on the side surface; a microphone positioned inside the housing so as to face the openings; a wireless communication circuit; a processor operatively connected to the audio output interface, the power input interface, the microphone, and the communication circuit; and a memory operatively connected to the processor. The memory may be configured to store instructions that, when executed, cause the processor to: receive a wake-up command through the microphone; recognize the wake-up command; transmit information related to reception of the wake-up command to a server through the communication circuit; receive a response from the server through the communication circuit; produce, based on the response, a first audio signal; and output the first audio signal through the audio output interface while the microphone is available. The audio signal may be a non-language sound.

According to various embodiments of the disclosure, a server may include: a communication circuit; a processor operatively connected to the communication circuit; and a memory operatively connected to the processor. The memory may be configured to cause, when executed, cause the processor to: receive information related to reception of a wake-up command from each of multiple electronic devices through the communication circuit; determine a first electronic device among the multiple electronic devices as an input/output device based on the information; produce a response to the information; and transmit the response to the first electronic device through the communication circuit. The information may include information indicating that the wake-up command is received and information indicating quality of the wake-up command.

According to various embodiments of the disclosure, a method for operating an electronic device may include the operations of: receiving a wake-up command through a microphone of the electronic device; recognizing the wake-up command; transmitting information related to reception of the wake-up command to a server through a communication circuit of the electronic device; receiving a response from the server through the communication circuit; producing, based on the response, a first audio signal; and outputting the first audio signal through an audio output interface of the electronic device while the microphone is available. The audio signal may be a non-language sound.

According to various embodiments of the disclosure, a method for operating a server may include the operations of: receiving information related to reception of a wake-up command from each of multiple electronic devices through a communication circuit of the server; determining a first electronic device among the multiple electronic devices as an input/output device based on the information; producing a response to the information; and transmitting the response to the first electronic device through the communication circuit. The information may include information indicating that the wake-up command is received and information indicating quality of the wake-up command.

Advantageous Effects of Invention

Various embodiments of the disclosure may provide a voice recognition service through an electronic device that can be connected to a separate audio output device, thereby providing a voice recognition service having a quality confirming to the user's tastes.

BEST MODE FOR CARRYING OUT THE INVENTION

Prior to describing an embodiment of the disclosure, an integrated intelligence system to which an embodiment of the disclosure may be applied will now be described.

Figure 1:
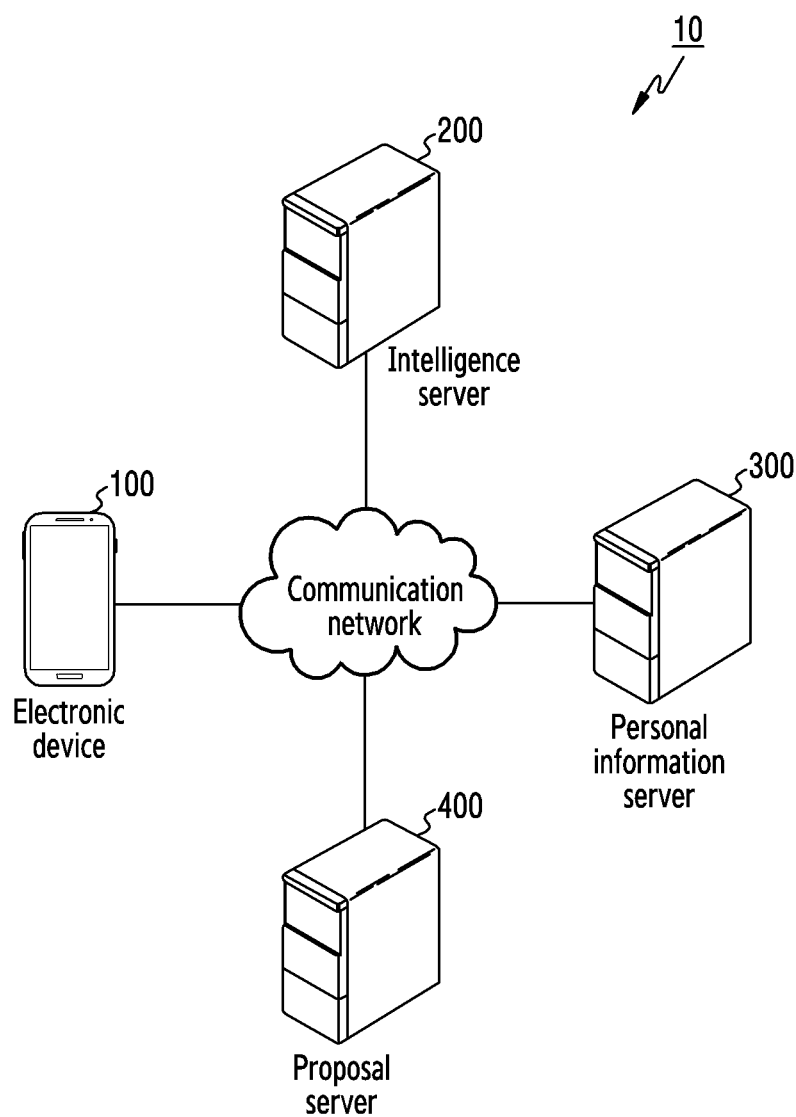
FIG. 1 is a diagram illustrating an integrated intelligence system according to various embodiments of the disclosure.

FIG. 1 is a diagram illustrating an integrated intelligence system according to various embodiments of the disclosure.

Referring to FIG. 1, the integrated intelligence system 10 may include a user terminal 100, an intelligence server 200, a personal information server 300, or a proposal server 400.

The user terminal 100 may provide a service necessary for a user through an app (or application program) (for example, alarm app, message app, picture (gallery) app, or the like) stored inside the user terminal 100. For example, the user terminal 100 may execute and operate another app through an intelligence app (or voice recognition app) stored inside the user terminal 100. A user input for executing and operating the other app through the intelligence app inside the user terminal 100 may be received. The user input may be received, for example, through a physical button, a touch pad, a voice input, a remote input, or the like. According to an embodiment, the user terminal 100 may correspond to various kinds of terminal devices (or electronic devices) that can be connected to the Internet, such as a mobile phone, a smartphone, a personal digital assistant (PDA), a laptop computer, or the like.

According to an embodiment, the user terminal 100 may receive the user's speech as a user input. The user terminal 100 may receive the user's speech and may produce a command that operates an app based on the user's speech. Accordingly, the user terminal 100 may operate the app by using the command.

The intelligence server 200 may receive a user voice input from the user terminal 100 through a communication network and may change the same to text data. In another embodiment, the intelligence server 200 may produce (or select) a path rule based on the text data. The path rule may include information regarding an action (or operation) for performing a function of the app, or information regarding a parameter necessary to execute the action. In addition, the path rule may include the order of the operations of the app. The user terminal 100 may receive the path rule, may select an app according to the path rule, and may execute an action included in the path rule in connection with the selected app.

The term "path rule" as used herein may generally refer to a sequence of states needed by an electronic device to perform a task requested by a user, but is not limited thereto. In other words, the path rule may include information regarding a sequence of states. The task may be an action that an intelligent app can provide, for example. The task may include producing a schedule, transmitting a picture to a desired counterpart, or providing weather information. The user terminal 100 may successively have at least one or more states (for example, operating state of the user terminal 100), thereby performing the task.

According to an embodiment, the path rule may be provided or produced by an artificial intelligent (AI) system. The AI system may be a rule-base system or a neural network-based system (for example, feedforward neural network (FNN) or recurrent neural network (RNN)). Alternatively, the AI system may be a combination of the above-mentioned systems, or an AI system different therefrom. According to an embodiment, the path rule may be selected from a set of path rules defined in advance, or may be produced in real time in response to a user request. For example, the AI system may select at least a path rule from multiple predefined path rules, or may produce a path rule dynamically (or in real time). In addition, the user terminal 100 may use a hybrid system to provide the path rule.

According to an embodiment, the user terminal 100 may execute the action and may display a screen corresponding to the state of the user terminal 100 that executed the action on the display. As another example, the user terminal 100 may execute the action and may not display the result of performing the action on the display. The user terminal 100 may execute multiple operations, for example, and may display the result of only some of the multiple actions on the display. The user terminal 100 may display only the result of executing the last action in the order, for example, on the display. As another example, the user terminal 100 may display the result of receiving the user's input and executing the action on the display.

The personal information server 300 may include a database in which user information is stored. For example, the personal information server 300 may receive user information (for example, context information, app execution, and the like) from the user terminal 100 and may store the same in the database. The intelligence server 200 may receive the user information from the personal information server 300 through a communication network and may use the same when producing a path rule regarding a user input. According to an embodiment, the user terminal 100 may receive user information from the personal information server 300 through a communication network and may use the same as information for managing the database.

The proposal server 400 may include a database storing information regarding introduction of a function or an application inside the terminal, or a function to be provided. For example, the proposal server 400 may include a database regarding a function that the user can use after receiving user information of the user terminal 100 from the personal information server 300. The user terminal 100 may receive information regarding the function to be provided, from the proposal server 400 through a communication network, and may provide the information to the user.

Figure 2:
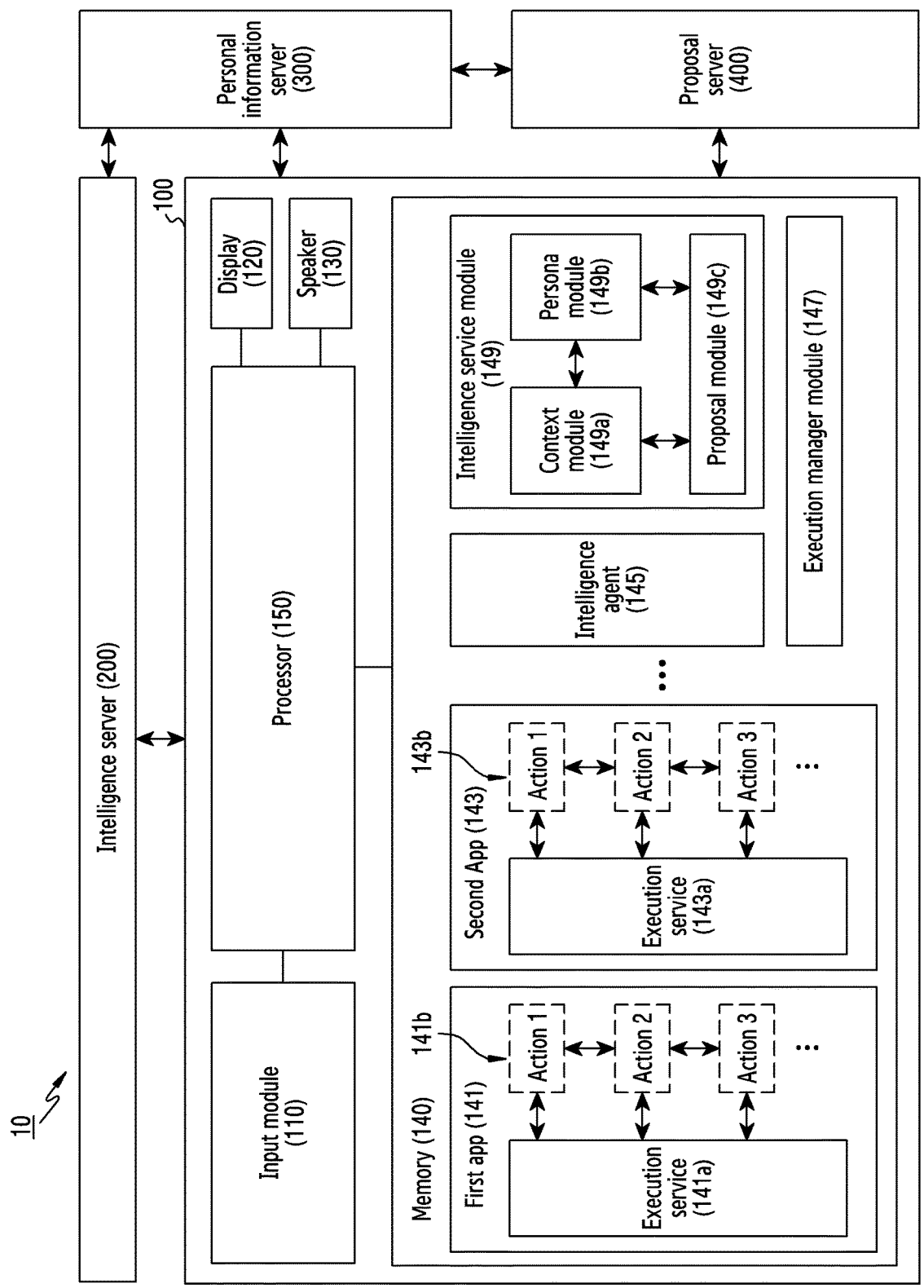
FIG. 2 is a block diagram illustrating a user terminal of an integrated intelligence system according to an embodiment of the disclosure.

FIG. 2 is a block diagram illustrating a user terminal of an integrated intelligence system according to an embodiment of the disclosure.

Referring to FIG. 2, the user terminal 100 may include an input module 110, a display 120, a speaker 130, a memory 140, or a processor 150. The user terminal 100 may further include a housing, and the elements of the user terminal 100 may be seated inside the housing or positioned on the housing. The user terminal 100 may further include a communication circuit positioned inside the housing. The user terminal 100 may transmit/receive data (or information) with an external server (for example, intelligence server 200) through the communication circuit.

According to an embodiment, the input module 110 may receive a user input from a user. For example, the input module 110 may receive a user input from a connected external device (for example, keyboard or headset). As another example, the input module 110 may include a touch screen (for example, touch screen display) coupled to the display 120. As another example, the input module 110 may include a hardware key (or physical key) positioned on the user terminal 100 (or on the housing of the user terminal 100).

According to an embodiment, the input module 110 may include a microphone capable of receiving the user's speech as a voice signal. For example, the input module 110 may include a speech input system, and may receive the user's speech as a voice signal through the speech input system. The microphone may be exposed through a part (for example, first portion) of the housing, for example.

According to an embodiment, the display 120 may display an execution screen for an image, a video, and/or an application. For example, the display 120 may display a graphic user interface (GUI) of an app. According to an embodiment, the display 120 may be exposed through a part (for example, second portion) of the housing.

According to an embodiment, the speaker 130 may output a voice signal. For example, the speaker 130 may output a voice signal produced inside the user terminal 100 to the outside. According to an embodiment, the speaker 130 may be exposed through a part (for example, third portion) of the housing.

According to an embodiment, the memory 140 may store multiple apps (or application programs) 141 and 143. The multiple apps 141 and 143 may be programs for performing a function corresponding to a user input, for example. According to an embodiment, the memory 140 may store an intelligence agent 145, an execution manager module 147, or an intelligence service module 149. The intelligence agent 145, the execution manager module 147, and the intelligence service module 149 may be, for example, frameworks (or application frameworks) for processing a received user input (for example, user speech).

According to an embodiment, the memory 140 may include a database capable of storing information necessary to recognize a user input. For example, the memory 140 may include a log database capable of storing log information. As another example, the memory 140 may include a persona database capable of storing user information.

According to an embodiment, the memory 140 may store multiple apps 141 and 143, and the multiple apps 141 and 143 may be loaded and operated. For example, the multiple apps 141 and 143 stored in the memory 140 may be loaded by the execution manager module 147 and then operated. The multiple apps 141 and 143 may include execution service modules 141*a* and 143*a* for performing functions. In an embodiment, the multiple apps 141 and 143 may execute multiple actions (for example, sequence of states) 141*b* and 143*b* through the execution service modules 141*a* and 143*a* in order to perform a function. In other words, the execution service modules 141*a* and 143*a* may be activated by the execution manager module 147, and may execute multiple actions 141*b* and 143*b*.

According to an embodiment, when the actions 141*b* and 143*b* of the apps 141 and 143 are executed, an execution state screen resulting from execution of the actions 141*b* and 143*b* may be displayed on the display 120. The execution state screen may be, for example, a screen corresponding to a state in which the actions 141*b* and 143*b* are completed. The execution state screen may be, as another example, a screen when corresponding to partial landing of the actions 141*b* and 143*b* (for example, when parameters necessary for the actions 141*b* and 143*b* are not input).

According to an embodiment, the execution service modules 141*a* and 143*a* may execute the actions 141*b* and 143*b* according to a path rule. For example, the execution service modules 141*a* and 143*a* may be activated by the execution manager module 147, may receive an execution request from the execution manager module 147 according to the path rule, and may perform the actions 141*b* and 143*b* according to the execution request, thereby executing functions of the apps 141 and 143. When the actions 141*b* and 143*b* are completely performed, the execution service modules 141*a* and 143*a* may deliver completion information to the execution manager module 147.

According to an embodiment, when multiple actions 141*b* and 143*b* are executed in the apps 141 and 143, the multiple actions 141*b* and 143*b* may be executed successively. When one action (for example, action 1 of the first app 141 or action 1 of the second app 143) is completely executed, the execution service modules 141*a* and 143*a* may open the next action (for example, action 2 of the first app 141 or action 2 of the second app 143), and may transmit completion information to the execution manager module 147. Opening a specific action, as used herein, may be understood as transitioning the specific action to an executable state, or preparing for execution of the specific action. In other words, unless a specific action is opened, the corresponding action cannot be executed. When the completion information is received, the execution manager module 147 may deliver an execution request regarding the next action (for example, action 2 of the first app 141 or action 2 of the second app 143) to the execution service module. According to an embodiment, when multiple apps 141 and 143 are executes, the multiple apps 141 and 143 may be executed successively. For example, when the last action of the first app 141 (for example, action 3 of the first app 141) is completely executed, and when completion information is accordingly received, the execution manager module 147 may transmit a request for executing the first action of the second app 143 (for example, action 1 of the second app 143) to the execution service 143*a*.

According to an embodiment, when multiple actions 141*b* and 143*b* are executed in the apps 141 and 143, the result screens following execution of the multiple actions 141*b* and 143*b*, respectively, may be displayed on the display 120. According to an embodiment, only some of the result screens following execution of the multiple actions 141*b* and 143*b*, respectively, may be displayed on the display 120.

According to an embodiment, the memory 140 may store an intelligence app (for example, speech recognition app) interworking with the intelligence agent 145. The app interworking with the intelligence agent 145 may receive and process the user's speech as a voice signal. According to an embodiment, the app interworking with the intelligence agent 145 may be operated by means of a specific input made through the input module 110 (for example, an input through the hardware key, an input through the touch screen, or a specific voice input).

According to an embodiment, the intelligence agent 145, the execution manager module 147, or the intelligence service module 149 stored in the memory 140 may be executed by the processor 150. The function of the intelligence agent 145, the execution manager module 147, or the intelligence service module 149 may be implemented by the processor 150. Actions of the processor 150 will be described with regard to functions of the intelligence agent 145, the execution manager module 147, and the intelligence service module 149. According to an embodiment, the intelligence agent 145, the execution manager module 147, or the intelligence service module 149 stored in the memory 140 may be implemented not only as software, but also as hardware.

According to an embodiment, the processor 150 may control overall actions of the user terminal 100. For example, the processor 150 may control the input module 110 so as to receive a user input. The processor 150 may control the display 120 so as to display an image. The processor 150 may control the speaker 130 so as to output a voice signal. The processor 150 may control the memory 140 so as to execute a program and to retrieve or store necessary information.

According to an embodiment, the processor 150 may execute the intelligence agent 145, the execution manager module 147, or the intelligence service module 149 stored in the memory 140. Accordingly, the processor 150 may implement the function of the intelligence agent 145, the execution manager module 147, or the intelligence service module 149.

According to an embodiment, the processor 150 may execute the intelligence agent 145 so as to produce a command for operating an app based on a voice signal received as a user input. According to an embodiment, the processor 150 may execute the execution manager module 147 so as to execute the apps 141 and 143 stored in the memory 140 according to the produced command. According to an embodiment, the processor 150 may execute the intelligence service module 149 so as to manage the user's information and to process the user input by using the user's information.

The processor 150 may execute the intelligence agent 145 so as to transmit the user input received through the input module 110 to the intelligence server 200 and to process the user input through the intelligence server 200.

According to an embodiment, the processor 150 may execute the intelligence server 145 so as to preprocess the user input before transmitting the user input to the intelligence server 200. According to an embodiment, the intelligence agent 145 may include, in order to preprocess the user input, an adaptive echo canceller (AEC) module, a noise suppression (NS) module, an end-point detection (EPD) module, or an automatic gain control (AGC) module. The AEC module may remove an echo included in the user input. The NS module may suppress background noise included in the user input. The EPD module may detect the end point of a user voice included in the user input, and may find a part on which the user's voice exists by using the detected end point. The AGC module may recognize the user input and may adjust the volume of the user input to be appropriate for processing the recognized user input. According to an embodiment, the processor 150 may execute all of the above preprocessing elements for performance, but the processor 150 may execute some of the preprocessing elements, in another embodiment, in order to operate with low power.

According to an embodiment, the intelligence agent 145 may execute a wake-up recognition module stored in the memory 140 in order to recognize the user's call. Accordingly, the processor 150 may recognize the user's wake-up command through the wake-up recognition module and, upon receiving the wake-up command, may execute the intelligence agent 145 for receiving a user input. The wake-up recognition module may be implemented as a low-power processor (for example, a processor included in an audio codec). According to an embodiment, the processor 150 may execute the intelligence agent 145 when a user input is received through the hardware key. When the intelligence agent 145 is executed, an intelligence app (for example, voice recognition app) interworking with the intelligence agent 145 may be executed.

According to an embodiment, the intelligence agent 145 may include a voice recognition module for executing a user input. The processor 150 may recognize a user input for executing an action in an app through the voice recognition module. For example, the processor 150 may recognize a limited user (voice) input (for example, speech such as "Click" for executing an imaging action while a camera app is executed) for executing an action such as the wake-up command in the apps 141 and 143 through the voice recognition module. The processor 150 may assist the intelligence server 200 such that a user command that can be processed inside the user terminal 100 can be recognized and quickly processed through the voice recognition module. According to an embodiment, the voice recognition module of the intelligence agent 145 for executing a user input may be implemented in an app processor.

According to an embodiment, the voice recognition module of the intelligence agent 145 (including the voice recognition module of the wake-up module) may recognize a user input by using an algorithm for recognizing a voice. The algorithm used to recognize a voice may be at least one of a hidden Markov model (HMM) algorithm, an artificial neural network (ANN) algorithm, or a dynamic time warping (DTW) algorithm, for example.

According to an embodiment, the processor 150 may execute the intelligence agent 145 so as to convert the user's voice input into text data. For example, the processor 150 may transmit the user's voice to the intelligence server 200 through the intelligence agent 145, and may receive text data corresponding to the user's voice from the intelligence server 200. Accordingly, the processor 150 may display the converted text data on the display 120.

According to an embodiment, the processor 150 may execute the intelligence agent 145 so as to receive a path rule from the intelligence server 200. According to an embodiment, the processor 150 may deliver the path rule to the execution manager module 147 through the intelligence agent 145.

According to an embodiment, the processor 150 may execute the intelligence agent 145 so as to deliver a log corresponding to the result of execution according to the path rule received from the intelligence server 200, to the intelligence service module 149, and the delivered execution result log may be accumulated in the user's preference information in the persona manager 149b and managed accordingly.

According to an embodiment, the processor 150 may execute the execution manager module 147 so as to receive the path rule from the intelligence agent 145, to execute the apps 141 and 143, and to cause the apps 141 and 143 to execute the actions 141b and 143b included in the path rule. For example, the processor 150 may transmit command information (for example, path rule information) for executing the actions 141b and 143b to the apps 141 and 143 through the execution manager module 147, and may receive information regarding completion of the actions 141b and 143b from the apps 141 and 143.

According to an embodiment, the processor 150 may execute the execution manager module 147 so as to deliver command information (for example, path rule information) for executing the actions 141b and 143b of the apps 141 and 143 between the intelligence agent 145 and the apps 141 and 143. The processor 150 may bind the apps 141 and 143 to be executed according to the path rule through the execution manager module 147, and may deliver command information (for example, path rule information) of the actions 141b and 143b included in the path rule to the apps 141 and 143. For example, the processor 150 may successively deliver the actions 141b and 143b included in the path rule to the apps 141 and 143 through the execution manager module 147 such that the actions 141b and 143b of the apps 141 and 143 are successively executed according to the path rule.

According to an embodiment, the processor 150 may execute the execution manager module 147 so as to manage the execution state of the actions 141b and 143b of the apps 141 and 143. For example, the processor 150 may receive information regarding the execution state of the actions 141b and 143b from the apps 141 and 143 through the execution manager module 147. When the execution state of the actions 141b and 143b is, for example, partial landing (for example, when parameters necessary for the actions 141b and 143b are not input), the processor 150 may deliver information regarding the partial landing to the intelligence agent 145 through the execution manager module 147. By using the information delivered through the intelligence agent 145, the processor 150 may request the user to input necessary information (for example, parameter information). When the execution state of the actions 141b and 143b is, as another example, an operating state, the processor 150 may receive a speech from the user through the intelligence agent 145. The processor 150 may deliver information regarding the apps 141 and 143 currently executed and the execution state of the apps 141 and 143 to the intelligence agent 145 through the execution manager module 147. The processor 150 may transmit the user speech to the intelligence server 200 through the intelligence agent 145. The processor 150 may receive parameter information of the user's speech from the intelligence server 200 through the intelligence agent 145. The processor 150 may deliver the received parameter information to the execution manager module 147 through the intelligence agent 145. The execution manager module 147 may change parameters of the actions 141b and 143c to new parameters by using the received parameter information.

According to an embodiment, the processor 150 may execute the execution manager module 147 so as to deliver parameter information included in the path rule to the apps 141 and 143. When multiple apps 141 and 143 are executed successively according to the path rule, the execution manager module 147 may deliver parameter information included in the path rule from one app to another app.

According to an embodiment, the processor 150 may execute the execution manager module 147 so as to receive multiple path rules. The processor 150 may select multiple path rules based on the user's speech through the execution manager module 147. For example, when a specific app 141 to execute a specific action 141a was specified by the user's speech through the execution manager module 147, and when no different app 143 to execute the remaining action 143b was specified, the processor 150 may receive multiple different path rules such that the same app 141 (for example, gallery app) to execute the specific action 141a is executed, and different apps 143 (for example, message app and telegram app) capable of executing the remaining action 143b are executed, respectively. The processor 150 may execute identical actions 141b and 143b (for example, continuous identical actions 141b and 143b) of the multiple path rules through the execution manager module 147, for example. After executing up to the identical actions, the processor 150 may display, on the display 120, a state screen that enables selection of different apps 141 and 143 included in the multiple path rules through the execution manager module 147.

According to an embodiment, the intelligence service module 149 may include a context module 149a, a persona module 149b, or a proposal module 149c.

The processor 150 may execute the context module 149a so as to collect the current state of the apps 141 and 143 from the apps 141 and 143. For example, the processor 150 may execute the context module 149a so as to receive context information indicating the current state of the apps 141 and 143, and may collect the current state of the apps 141 and 143 through the received context information.

The processor 150 may execute the persona module 149b so as to manage the personal information of the user using the user terminal 100. For example, the processor 150 may execute the persona module 149b so as to collect use information of the user terminal 100 and execution results, and may manage the user's personal information by using the collected use information of the user terminal 100 and execution results.

The processor 150 may execute the proposal module 149c so as to predict the user's intent and to recommend a command to the user based on the user's intent. For example, the processor 150 may execute the proposal module 149c so as to recommend a command to the user according to the user's current state (for example, time, place, situation, app).

Figure 3:
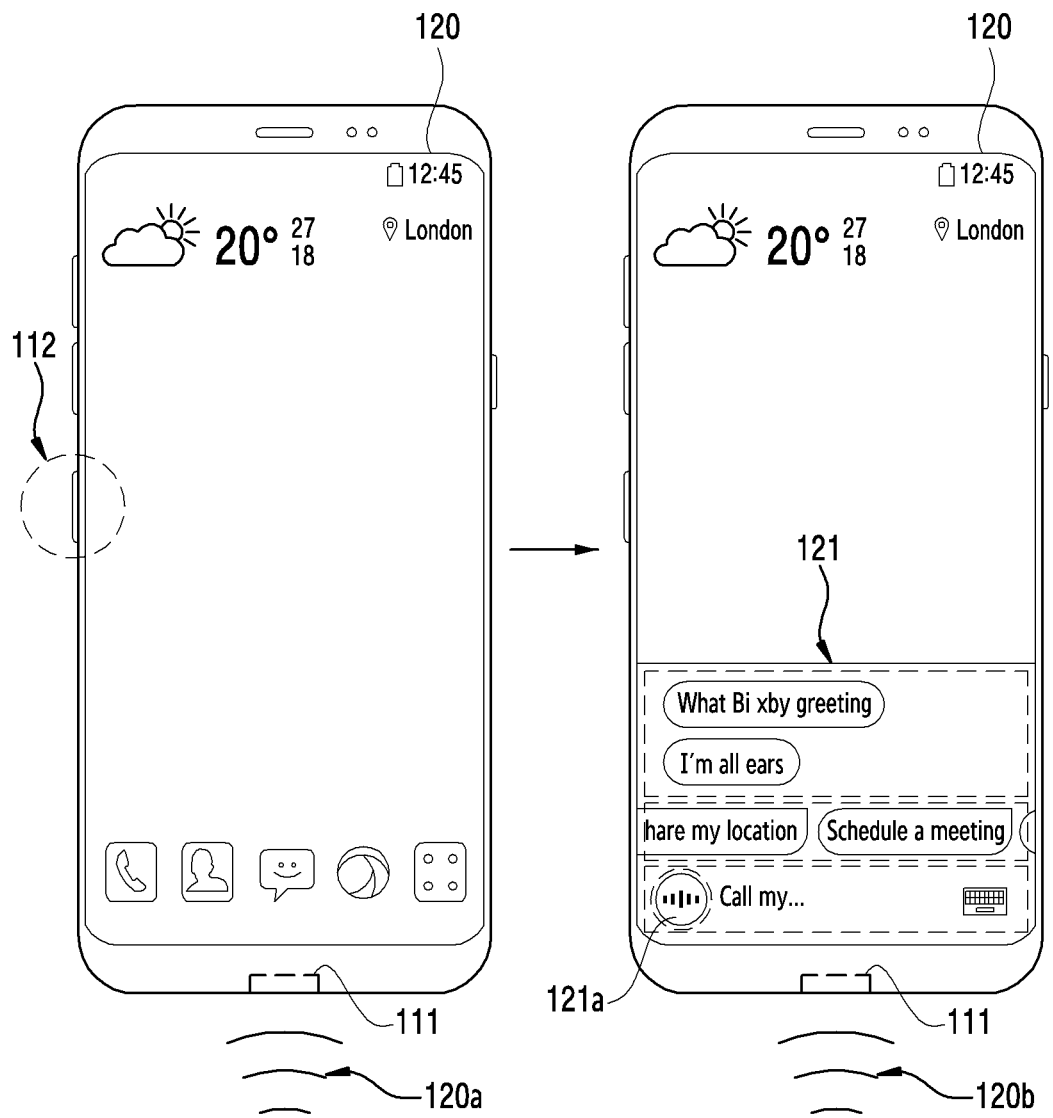
FIG. 3 is a diagram illustrating execution of an intelligence app of a user terminal according to an embodiment of the disclosure.

FIG. 3 is a diagram illustrating execution of an intelligence app by a user terminal according to an embodiment of the disclosure.

Referring to FIG. 3, a user terminal 100 is illustrated as receiving a user input and executing an intelligence app (for example, voice recognition app) interworking with an intelligence agent 145.

According to an embodiment, the user terminal 100 may execute an intelligence app for recognizing a voice through a hardware key 112. For example, upon receiving a user input through the hardware key 112, the user terminal 100 may display a user interface (UI) 121 of the intelligence app on a display 120. The user may touch a voice recognition button 121a on the UI 121 of the intelligence app, in order to input (111b) a voice while the UI 121 of the intelligence app is displayed on the display 120. The user may input (120b) a voice by continuously pressing the hardware key 112, in order to input (120b) a voice, as another example.

According to an embodiment, the user terminal 100 may execute an intelligence app for recognizing a voice through a microphone 111. For example, the user terminal 100 may display a UI 121 of the intelligence app on the display 120 when a designated voice (for example, Wake up!) is input (111a) through the microphone 111.

Figure 4:
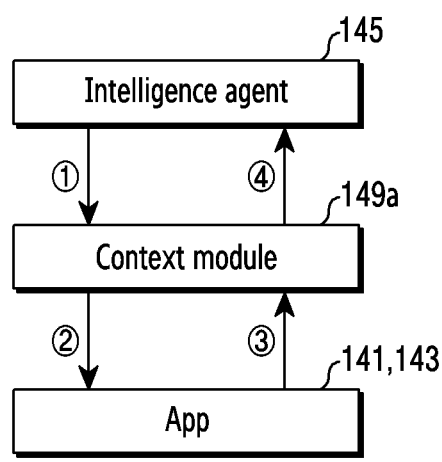
FIG. 4 is a diagram illustrating a context module of an intelligence service module according to an embodiment of the disclosure collecting the current state.

FIG. 4 is a diagram illustrating a context module of an intelligence service module according to an embodiment of the disclosure collecting the current state.

Referring to FIG. 4, upon receiving (①) a context request from an intelligence agent 145, the processor 150 may request (②) context information indicating the current state of apps 141 and 143 through a context module 149a. According to an embodiment, the processor 150 may receive (③) the context information from the apps 141 and 143 through the context module 149a and may transmit (④) the same to the intelligence agent 145.

According to an embodiment, the processor 150 may receive multiple pieces of context information from the apps 141 and 143 through the context module 149a. The context information may be, for example, information regarding the most recently executed apps 141 and 143. The context information may be, as another example, information regarding the current state inside the apps 141 and 143 (for example, when viewing a picture at a gallery, information regarding the corresponding picture).

According to an embodiment, the processor 150 may receive context information indicating the current state of the user terminal 100 not only from the apps 141 and 143, but also from a device platform, through the context module 149a. The context information may include general context information, user context information, or device context information.

The general context information may include general information of the user terminal 100. The general context information may be identified through an internal algorithm after receiving data through a sensor hub or the like of the device platform. For example, the general context information may include information regarding the current spacetime. The information regarding the current spacetime may include information regarding the current time or the current position of the user terminal 100, for example. The current time may be identified through the time on the user terminal 100, and the information regarding the current position may be identified through a global positioning system (GPS). As another example, the general context information may include information regarding a physical movement. The information regarding a physical movement may include information regarding walking, running, driving state, or the like, for example. The physical movement information may be identified through a motion sensor. In connection with the information regarding the driving state, not only can traveling be identified through the motion sensor, but boarding and parking can also be identified by sensing Bluetooth connection inside the vehicle. As another example, the general context information may include user activity information. The user activity information may include, for example, information regarding going to/out of office, shopping, traveling, or the like. The user activity information may be identified by using information regarding a place registered in a database by the user or app.

The user context information may include information regarding the user. For example, the user context information may include information regarding the user's emotional state. The information regarding the emotional state may include, for example, information regarding the user's happiness, sadness, anger, or the like. As another example, the user context information may include information regarding the user's current state. The information regarding the current state may include, for example, information regarding an interest, intent (for example, shopping), or the like.

The device context information may include information regarding the state of the user terminal 100. For example, the device context information may include information regarding a path rule executed by the execution manager module 147. As another example, the device information may include information regarding the battery. The information regarding the battery may be identified through the charging and discharging states of the battery, for example. As another example, the device information may include information regarding a connected device and a network. The information regarding connected device may be identified through a communication interface to which the device is connected, for example.

Figure 5:
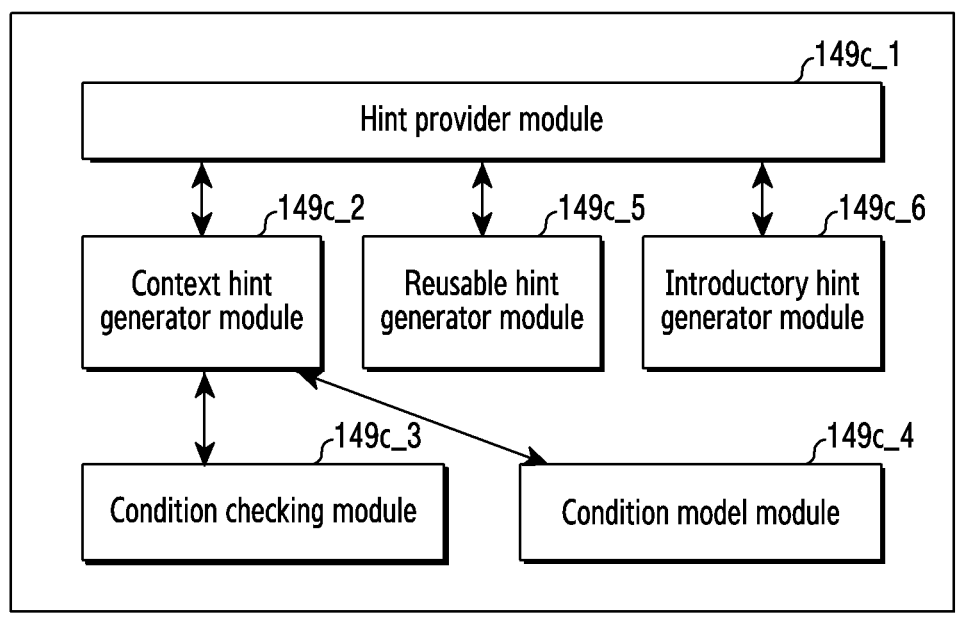
FIG. 5 is a block diagram illustrating a proposal module of an intelligence service module according to an embodiment of the disclosure.

FIG. 5 is a block diagram illustrating a proposal module of an intelligence service module according to an embodiment of the disclosure.

Referring to FIG. 5, the proposal module 149c may include a hint provider module 149c_1, a context hint generator module 149c_2, a condition checking module 149c_3, a condition model module 149c_4, a reusable hint generator module 149c_5, or an introductory hint generator module 149c_6.

According to an embodiment, the processor 150 may execute the hint provider module 149c_1 so as to provide a hint to the user. For example, the processor 150 may receive a hint produced by the context hint generator module 149c_2, the reusable hint generator module 149c_5, or the introductory hint generator module 149c_6 through the hint provider module 149c_1, and may provide the hint to the user.

According to an embodiment, the processor 150 may execute the condition checking module 149c_3 or the condition model module 149c_4 so as to produce a hint that can be recommended according to the current state. The processor 150 may execute the condition checking module 149c_3 so as to receive information corresponding to the current state, and may execute the condition model module 149C-4 so as to configure a condition model by using the received information. For example, the processor 150 may execute the condition model module 149c_4 so as to identify the point of time at which a hint is provided to the user, the position, the situation, the currently used app, and the like, thereby providing hints that are highly likely to be used under the corresponding condition to the user, a hint having the highest priority being provided first.

According to an embodiment, the processor 150 may execute the reusable hint generator module 149c_5 so as to produce hints that can be recommended according to the frequency of use. For example, the processor 150 may execute the reusable hint generator module 149c_5 so as to produce hints based on the user's use pattern.

According to an embodiment, the introductory hint generator module 149c_6 may produce hints for introducing, to the user, new functions or functions frequently used by other users. For example, the hints for introducing new functions may include introductions regarding the intelligence agent 145 (for example, operating method).

According to another embodiment, the context hint generator module 149c_2, the condition checking module 149c_3, the condition model module 149c_4, the reusable hint generator module 149c_5, or the introductory hint generator module 149c_6 of the proposal module 149c may be included in the personal information server 300. For example, the processor 150 may receive a hint from the context hint generator module 149c_2, the reusable hint generator module 149c_5, or the introductory hint generator module 149c_6 of the user personal information server 300 through the hint provider module 149c_1 of the proposal module 149c, and may provide the received hint to the user.

According to an embodiment, the user terminal 100 may provide a hint according to the following series of processes. For example, upon receiving a hint provision request from the intelligence agent 145, the processor 150 may deliver a hint production request to the context hint generator module 149c_2 through the hint provider module 149c_1. Upon receiving the hint production request, the processor 150 may receive information corresponding to the current state from the context module 149a and the persona module 149b through the condition checking module 149c_3. The processor 150 may deliver the information received through the condition checking module 149c_3 to the condition model module 149c_4, and may assign priorities to hints, among hints provided to the user by using the information through the condition model module 149c_4, in an order such that a hint mostly likely to be used under the condition comes first. The processor 150 may identify (⑥) the condition through the context hint generator module 149c_2, and may produce a hint corresponding to the current state. The processor 150 may deliver the produced hint to the hint provider module 149c_1 through the context hint generator module 149c_2. The processor 150 may align the hint according to a designated rule through the hint provider module 149c_1, and may deliver the hint to the intelligence agent 145.

According to an embodiment, the processor 150 may produce multiple context hints through the hint provider module 149c_1, and may assign priorities to the multiple context hints according to a designated rule. According to an embodiment, the processor 150 may first provide one of the multiple context hints, which has the highest priority, to the user through the hint provider module 149c_1.

According to an embodiment, the user terminal 100 may propose a hint according to the frequency of use. For example, upon receiving a hint provision request from the intelligence agent 145, the processor 150 may deliver a hint production request to the reusable hint generator module 149c_5 through the hint provider module 149c_1. Upon receiving the hint production request, the processor 150 may receive user information from the persona module 149b through the reusable hint generator module 149c_5. For example, the processor 150 may receive a path rule included in preference information of the user of the persona module 149b, a parameter included in the path rule, the frequency of execution of an app, and information regarding the space-time at which the app is used, through the reusable hint generator module 149c_5. The processor 150 may produce a hint corresponding to the user information received through the reusable hint generator module 149c_5. The processor 150 may deliver the produced hint to the hint provider module 149c_1 through the reusable hint generator module 149c_5. The processor 150 may align the hint through the hint provider module 149c_1 and may deliver the hint to the intelligence agent 145.

According to an embodiment, the user terminal 100 may propose a hint regarding a new function. For example, upon receiving a hint provision request from the intelligence agent 145, the processor 150 may deliver a hint production request to the introductory hint generator module 149c_6 through the hint provider module 149c_1. The processor 150 may deliver an introductory hint provision request from the proposal server 400 through the introductory hint generator module 149c_6 and may receive information regarding a function to be introduced from the proposal server 400. The proposal server 400 may store information regarding functions to be introduced, for example, and a hint list regarding the functions to be introduced may be updated by the service operator. The processor 150 may deliver the produced hint to the hint provider module 149c_1 through the introductory hint generator module 149c_6. The processor 150 may align the hint through the hint provider module 149c_1 and may transmit (⑥) the hint to the intelligence agent 145.

Accordingly, the processor 150 may provide a hint produced by the context hint generator module 149c_2, the reusable hint generator module 149c_5, or the introductory hint generator module 146c_6 to the user through the proposal module 149c. For example, the processor 150 may display the produced hint in an app that operates the intelligence agent 145 through the proposal module 149c, and may receive an input of selecting the hint from the user through the app.

Figure 6:
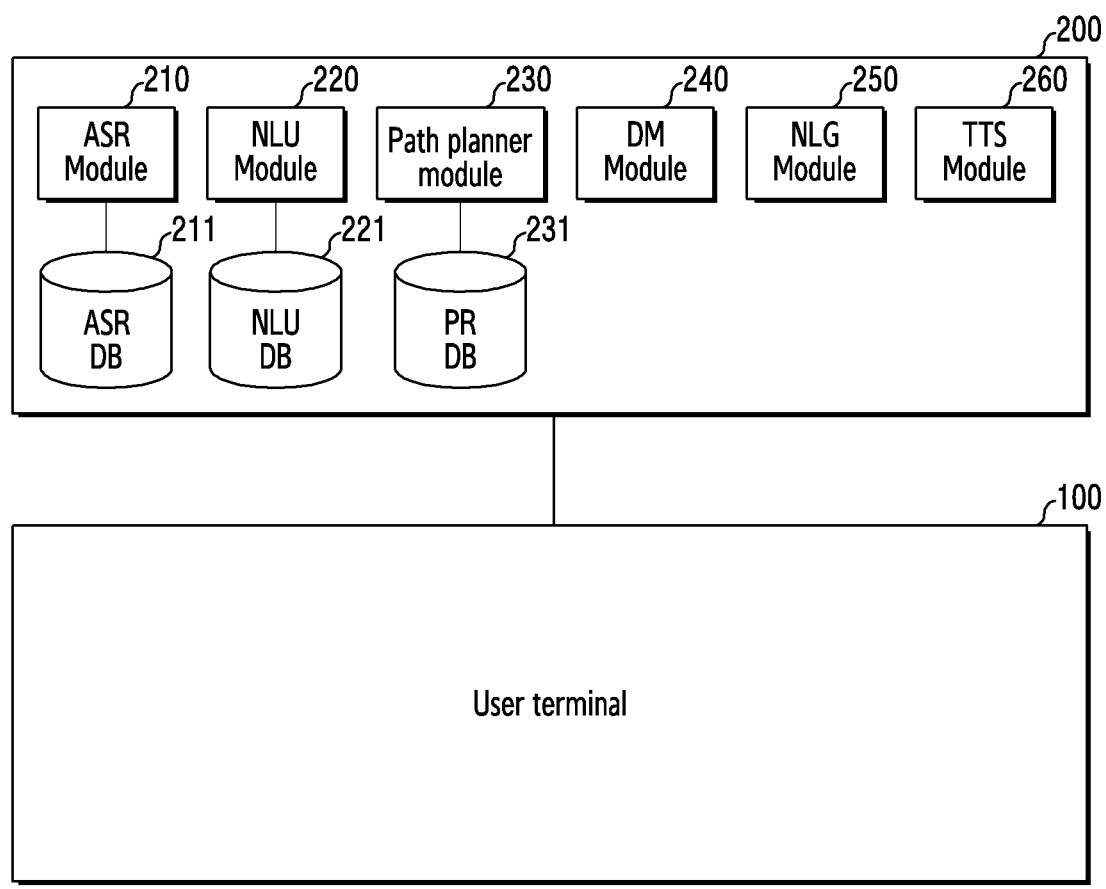
FIG. 6 is a block diagram illustrating an intelligence server of an integrated intelligence system according to an embodiment of the disclosure.

FIG. 6 is a block diagram illustrating an intelligence server of an integrated intelligence system according to an embodiment of the disclosure.

Referring to FIG. 6, the intelligence server 200 may include an automatic speech recognition (ASR) module 210, a natural language understanding (NLU) module 220, a path planner module 230, a dialogue manager (DM) module 240, a natural language generator (NLG) module 250, or a text-to-speech (TTS) module 260. According to an embodiment, the intelligence server 200 may include a communication circuit, a memory, and a processor. The processor may execute an instruction stored in the memory so as to drive the ASR module 210, the NLU module 220, the path planner module 230, the DM module 240, the NLG module 250, and the TTS module 260. The intelligence server 200 may transmit/receive data (or information) with an external electronic device (for example, user terminal 100) through the communication circuit.

The NLU module 220 or the path planner module 230 of the intelligence server 200 may produce a path rule.

According to an embodiment, the automatic speech recognition (ASR) module 210 may convert a user input received from the user terminal 100 into text data.

According to an embodiment, the ASR module 210 may convert a user input received from the user terminal 100 into text data. For example, the ASR module 210 may include a speech recognition module. The speech recognition module may include an acoustic model and a language model. For example, the acoustic model may include information regarding vocalization, and the language model may include unit phoneme information and information regarding a combination of unit phoneme information. The speech recognition module may convert user speech into text data by using the information regarding vocalization and the information regarding unit phoneme information. Information regarding the acoustic model and the language model may be stored in an automatic speech recognition database (ASR DB) 211, for example.

According to an embodiment, the NLU module 220 may perform syntactic analysis or semantic analysis so as to identify the user intent. In connection with the syntactic analysis, a user input may be divided into syntactic units (for example, words, phrases, morphemes, and the like), and it may be identified what syntactic elements the divided units have. The sematic analysis may be performed by using semantic matching, rule matching, formula matching, or the like. Accordingly, the NLU module 220 may identify the domain to which the user input belongs or the intent, or may obtain a parameter (or slot) necessary to express the intent.

According to an embodiment, the NLU module 220 may use a matching rule divided into a domain, an intent, and a parameter (or slot) necessary to identify the intent, thereby determining the user's intent and the parameter. For example, the single domain (for example, alarm) may include multiple intents (for example, configuring alarm, releasing alarm, and the like), and a single intent may include multiple parameters (for example, time, number of repetitions, alarm sound, and the like). Multiple rules may include, for example, one or more necessary element parameters. The matching rule may be stored in a natural language understanding database (NLU DB) 221.

According to an embodiment, the NLU module 220 may identify the meaning of a word extracted from a user input by using linguistic features (for example, syntactic elements) such as morphemes, phrases, and the like, and may match the identified meaning of the word with a domain and an intent, thereby determining the user's intent. For example, the NLU module 220 may calculate the extent of inclusion of the word extracted from the user input in respective domains and intents, thereby determining the user intent. According to an embodiment, the NLU module 220 may determine the parameter of the user input by using the word that served as a basis for identifying the intent. According to an embodiment, the NLU module 220 may determine the user's intent by using the NLU DB 221 that stores linguistic features for identifying the intent of the user input. According to another embodiment, the NLU module 220 may determine the user's intent by using a personal language model (PLM). For example, the NLU module 220 may determine the user's intent by using personal information (for example, contact list, music list). The PLM may be stored in the NLU DB 221, for example. According to an embodiment, not only the NLU module 220, but also the ASR module 210 may recognize the user's voice with reference to the PLM stored in the NLU DB 221.

According to an embodiment, the NLU module 220 may produce a path rule based on the intent of the user input and the parameter. For example, the NLU module 220 may select an app to be executed based on the intent of the user input, and may determine an action to be executed in the selected app. The NLU module 220 may determine a parameter corresponding to the determined action, thereby producing a path rule. According to an embodiment, the path rule produced by the NLU module 220 may include information regarding an app to be executed, an action (for example, at least one or more states) to be executed in the app, and a parameter necessary to execute the action.

According to an embodiment, the NLU module 220 may produce one path rule or multiple path rules based on the intent of the user input and the parameter. For example, the NLU module 220 may receive a path rule set corresponding to the user terminal 100 from the path planner module 230, and may map the intent of the user input and the parameter to the received path rule set, thereby determining a path rule.

According to another embodiment, the NLU module 220 may determine, based on the intent of the user input and the parameter, an app to be executed, an action to be executed in the app, and a parameter necessary to execute the app, thereby producing one path rule or multiple path rules. For example, the NLU module 220 may arrange the app to be executed and the action to be executed in the app in an ontology or graph model form according to the intent of the user input, by using information of the user terminal 100, thereby producing a path rule. The produced path rule may be stored in a path rule database (PR DB) 231 through the path planner module 230, for example. The produced path rule may be added to the path rule set in the database 231.

According to an embodiment, the NLU module 220 may select at least one path rule from the produced multiple path rules. For example, the NLU module 220 may select an optimal path rule from the multiple path rules. As another example, the NLU module 220 may select multiple path rules when only some actions have been specified based on a user speech. The NLU module 220 may determine one path rule from the multiple path rules according to the user's additional input.

According to an embodiment, the NLU module 220 may transmit a path rule to the user terminal 100 at a request regarding a user input. For example, the NLU module 220 may transmit one path rule corresponding to a user input to the user terminal 100. As another example, the NLU module 220 may transmit multiple path rules corresponding to a user input to the user terminal 100. The multiple path rules may be produced by the NLU module 220 when only some actions have been specified based on the user speech, for example.

According to an embodiment, the path planner module 230 may select at least one path rule from multiple path rules.

According to an embodiment, the path planner module 230 may deliver a path rule set including multiple path rules to the NLU module 220. The multiple path rules in the path rule set may be stored in a table form in the path rule database 231 connected to the path planner module 230. For example, the path planner module 230 may deliver a path rule set corresponding to information (for example, OS information, app information) of the user terminal 100 received from the intelligence agent 145 to the NLU module 220. The table stored in the path rule database 231 may be stored with regard to each domain or domain version, for example.

According to an embodiment, the path planner module 230 may select one path rule or multiple path rules from the path rule set and may deliver the same to the NLU module 220. For example, the path planner module 230 may match the user's intent and the parameter with the path rule set corresponding to the user terminal 100, thereby selecting one path rule or multiple path rules, and may deliver the same to the NLU module 220.

According to an embodiment, the path planner module 230 may produce one path rule or multiple path rules by using the user's intent and the parameter. For example, the path planner module 230 may determine an app to be executed and an action to be executed in the app, based on the user's intent and the parameter, thereby producing one path rule or multiple path rules. According to an embodiment, the path planner module 230 may store the produced path rule in the PR DB 231.

According to an embodiment, the path planner module 230 may store a path rule produced by the NLU module 220 in the PR DB 231. The produced path rule may be added to the path rule set stored in the PR DB 231.

According to an embodiment, the table stored in the PR DB 231 may include multiple path rules or a set of multiple path rules. The multiple path rules or the set of multiple path rules may reflect the kind, version, type, or characteristics of the device performing each path rule.

According to an embodiment, the DM module 240 may confirm whether or not the user's intent identified by the NLU module 220 is clear. For example, the DM module 240 may confirm whether or not the user's intent is clear, based on whether or not information of a parameter is sufficient. The DM module 240 may confirm whether or not a parameter identified by the NLU module 220 is sufficient to perform a task. According to an embodiment, when the user's intent is not clear, the DM module 240 may perform a feedback for requesting the user to provide necessary information. For example, the DM module 240 may perform a feedback for requesting information regarding a parameter for identifying the user's intent.

According to an embodiment, the DM module 240 may include a content provider module. The content provider module may produce the result of performing a task corresponding to a user input, when an action can be performed based on an intent and a parameter identified by the NLU module 220. According to an embodiment, the DM module 240 may transmit the result produced by the content provider module to the user terminal 100 in response to a user input.

According to an embodiment, the NLG module 250 may convert designated information into a text form. The information converted to a text form may be of a natural language speech type. The designated information may be, for example, information regarding an additional input, information guiding completion of an action corresponding to a user input, or information guiding the user's additional input (for example, feedback information regarding a user input). The information converted to a text form may be transmitted to the user terminal 100 and then displayed on the display 120, or may be transmitted to the TTS module 260 and then changed to a voice form.

According to an embodiment, the TTS module 260 may change text-type information into voice-type information. The TTS module 260 may receive text-type information from the NLG module 250, may change the change text-type information to voice-type information, and may transmit the same to the user terminal 100. The user terminal 100 may output the voice-type information to the speaker 130.

According to an embodiment, the NLU module 220, the path planner module 230, and the DM module 240 may be implemented as a single module. For example, the NLU module 220, the path planner module 230, and the DM module 240 may implemented as a single module so as to determine the user's intent and the parameter, and may produce a response (for example, path rules) corresponding to the determined user's intent and parameter. Accordingly, the produced response may be transmitted to the user terminal 100.

Figure 7:
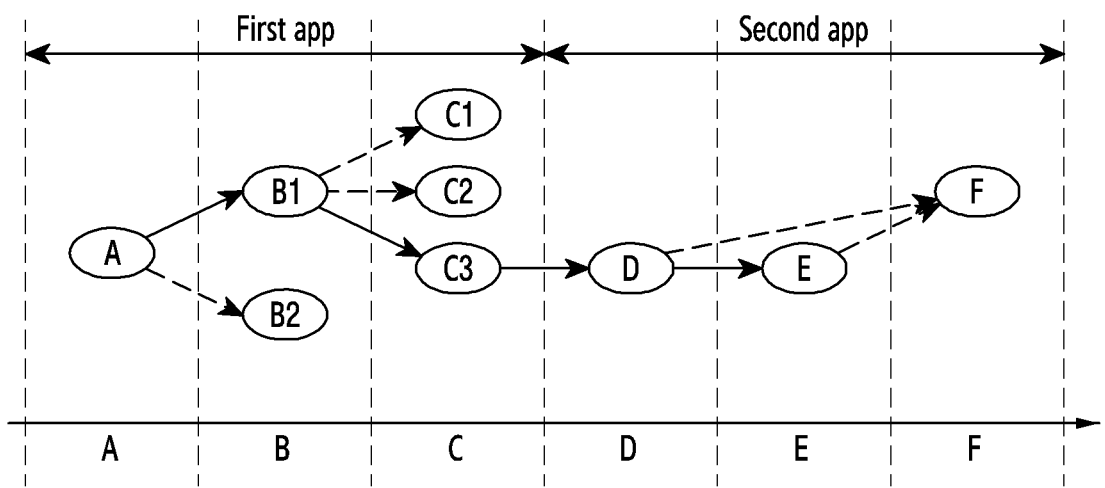
FIG. 7 is a diagram illustrating a method for producing a path rule by a path natural language understanding (NLU) module according to an embodiment of the disclosure.

FIG. 7 is a diagram illustrating a method for producing a path rule by a path planner module according to an embodiment of the disclosure.

Referring to FIG. 7, the NLU module 220 according to an embodiment may divide the function of an app into one of actions (for example, state A to state F) and store the same in the PR DB 231. For example, the NLU module 220 may store a path rule set including multiple path rules A-B1-C1, A-B1-C2, A-B1-C3-D-F, and A-B1-C3-D-E-F divided into one action (for example, state) in the PR DB 231.

According to an embodiment, the PR DB 231 of the path planner module 230 may store a path rule set for performing the function of an app. The path rule set may include multiple path rules including multiple actions (for example, sequence of states). The multiple path rules may have multiple actions which are executed according to parameters input thereto, respectively, and which are arranged successively. According to an embodiment, the multiple path rules may be configured in ontology or graph model forms and stored in the PR DB 231.

According to an embodiment, the NLU module 220 may select an optimal path rule A-B1-C3-D-F from the multiple path rules A-B1-C1, A-B1-C2, A-B1-C3-D-F, and A-B1-C3-D-E-F corresponding to the intent of a user input and the parameter.

According to an embodiment, when there is no path rule completely matching with the user input, the NLU module 220 may deliver multiple path rules to the user terminal 100. For example, the NLU module 220 may select a path rule (for example, A-B1) partially corresponding to a user input. The NLU module 220 may select one or more path rules A-B1-C1, A-B1-C2, A-B1-C3-D-F, and A-B1-C3-D-E-F, including a path rule (for example, A-B1) partially corresponding to a user input, and may deliver the same to the user terminal 100.

According to an embodiment, the NLU module 220 may select one from multiple path rules based on an additional input through the user terminal 100, and may deliver the selected path rule to the user terminal 100. For example, the NLU module 220 may select one path rule (for example, A-B1-C3-D-F) from multiple path rules (for example, A-B1-C1, A-B1-C2, A-B1-C3-D-F, and A-B1-C3-D-E-F) according to a user input (for example, input of selecting C3) that has been additionally input through the user terminal 100, and may transmit the same to the user terminal 100.

According to another embodiment, the NLU module 220 may determine a user intent and a parameter corresponding to a user input (for example, input of selecting C3) that has been additionally input to the user terminal 100 through the NLU module 220, and may transmit the determined user intent or parameter to the user terminal 100. The user terminal 100 may select one path rule (for example, A-B1-C3-D-F) from multiple path rules (for example, A-B1-C1, A-B1-C2, A-B1-C3-D-F, and A-B1-C3-D-E-F), based on the transmitted intent or the parameter.

Accordingly, the user terminal 100 may complete actions of the apps 141 and 143 by means of the selected path rule.

According to an embodiment, when a user input having insufficient information is received by the intelligence server 200, the NLU module 220 may produce a path rule partially corresponding to the received user input. For example, the NLU module 220 may transmit the partially corresponding path rule to the intelligence agent 145. The processor 150 may execute the intelligence agent 145 so as to receive the path rule and to deliver the partially corresponding path rule to the execution manager module 147. The processor 150 may execute the first app 141 according to the path rule through the execution manager module 147. The processor 150 may transmit information regarding an insufficient parameter to the intelligence agent 145 while executing the first app 141 through the execution manager module 147. The processor 150 may request an additional input from the user by using the information regarding an insufficient parameter through the intelligence agent 145. Upon receiving an additional input from the user through the intelligence agent 145, the processor 150 may transmit the user input to the intelligence server 200 and process the same. The NLU module 220 may produce an added path rule based on information regarding the parameter and the intent of the user input that has been additionally input, and may transmit the same to the intelligence agent 145. The processor 150 may transmit the path rule to the execution manager module 147 through the intelligence agent 145 and may execute the second app 143.

According to an embodiment, when a user input having partially missing information is received by the intelligence server 200, the NLU module 220 may transmit a user information request to the personal information server 300. The personal information server 300 may transmit information of a user who inputted a user input stored in the persona database to the NLU module 220. The NLU module 220 may select a path rule corresponding to a user input, which has a partially missing action, by using the user information. Accordingly, even when a user input having partially missing information is received by the intelligence server 200, the NLU module 220 may receive an additional input by requesting the missing information, or may determine a path rule corresponding to the user input by using user information.

Table 1, given below, may enumerate exemplary forms of path rules related to tasks requested by a user according to an embodiment.

TABLE 1

| Path rule ID | State | Parameter |
| --- | --- | --- |
| Gallery_101 | pictureView(25) | NULL |
| | searchView(26) | NULL |
| | searchViewResult(27) | Location, time |
| | SearchEmptySelectedView(28) | NULL |
| | SearchSelectedView(29) | ContentType, select all |
| | CrossShare(30) | anaphora |

Referring to Table 1, a path rule produced or selected by an intelligence server (intelligence server 200 in FIG. 1) according to a user speech (for example, "Share pictures") may include at least one state 25, 26, 27, 28, 29, or 30. For example, the at least one state (for example, one of operating states of the terminal) may correspond to at least one of picture application execution (PicturesView) 25, picture search function execution (SearchView) 26, search result display screen output (SearchViewResult) 27, outputting a search result display screen having no selected picture (SearchEmptySelectedView) 28, outputting a search result display screen having at least one selected picture (SearchSelectedView) 29, or shared application selection screen output (CrossShare) 30.

In an embodiment, parameter information of the path rule may correspond to at least one state. For example, the same may be included in the state 29 in which a search result display screen having at least one selected picture is output.

As a result of performing a path rule including a sequence of the above states 25, 26, 27, 28, and 29, the task requested by the user (for example, "Share pictures!") may be performed.

Figure 8:
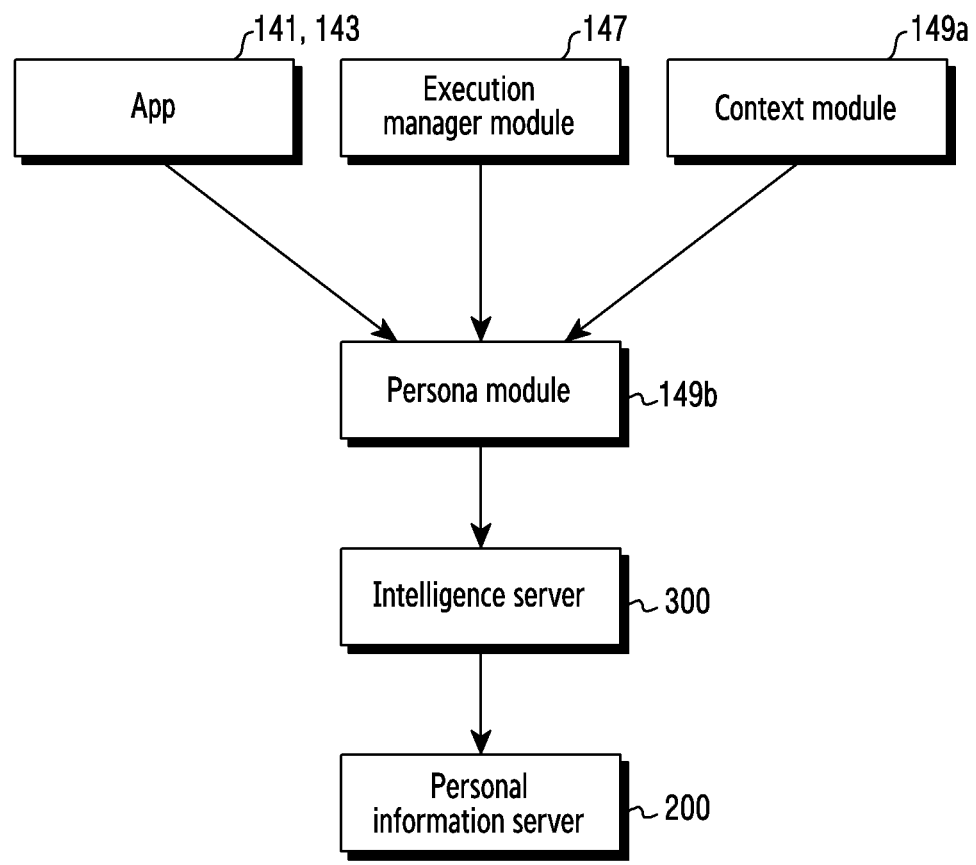
FIG. 8 is a diagram illustrating a persona module of an intelligence service module according to an embodiment of the disclosure managing user information.

FIG. 8 is a diagram illustrating a persona module of an intelligence service module according to an embodiment of the disclosure managing user information.

Referring to FIG. 8, the processor 150 may receive information of the user terminal 100 from the apps 141 and 143, the execution manager module 147, or the context module 149a through the persona module 149b. The processor 150 may store, in an action log database, information regarding the result of executing actions 141b and 143b of the apps through the apps 141 and 143 and the execution manager module 147. The processor 150 may store information regarding the current state of the user terminal 100 in a context database through the context module 149a. The processor 150 may receive the stored information from the action log database or the context database through the persona module 149b. Data stored in the action log database and the context database may be analyzed by an analysis engine, for example, and delivered to the persona module 149b.

According to an embodiment, the processor 150 may transmit information received from the apps 141 and 143, the execution manager module 147, or the context module 149a to the proposal module 149c through the persona module 149b. For example, the processor 150 may deliver data stored in the action log database or the context database to the proposal module 149c through the persona module 149b.

According to an embodiment, the processor 150 may transmit information received from the apps 141 and 143, the execution manager module 147, or the context module 149a to the personal information server 300 through the persona module 149b. For example, the processor 150 may periodically transmit data accumulated and stored in the action log database or the context database to the personal information server 300 through the persona module 149b.

According to an embodiment, the processor 150 may deliver data stored the action log database or the context database to the proposal module 149c through the persona module 149b. User information produced through the persona module 149b may be stored in a persona database. The persona module 149b may periodically transmit user information stored in the persona database to the personal information server 300. According to an embodiment, information transmitted to the personal information server 300 through the persona module 149b may be stored in the persona database. The personal information server 300 may infer user information necessary for the intelligence server 200 to produce a path rule, by using information stored in the persona database.

According to an embodiment, user information inferred by using information transmitted through the persona module 149b may include profile information or preference information. The profile information or preference information may be inferred through the user's account and accumulated information.

The profile information may include the user's personal status information. For example, the profile information may include the user's demographic statistics information. The demographic statistics information may include, for example, the user's gender, age, and the like. As another example, the profile information may include life event information. The life event information may be inferred by comparing log information with a life event model, for example, and may be enhanced by analyzing a behavior pattern. As another example, the profile information may include interest information. The interest information may include, for example, shopping items of interest, fields of interest (for example, sports, politics, and the like), and the like. As another example, the profile information may include activity region information. The activity region information may include, for example, information regarding home, working place, and the like. The information regarding activity regions may include not only information regarding the location of places, but also information regarding regions having priorities recorded with reference to the accumulated time of stay and the number of visits. As another example, the profile information may include activity time information. The activity time information may include, for example, information regarding the getting-up time, the time to go to/out of office, the sleeping time, and the like. The information regarding the time to go to/out of office may be inferred by using the activity region information (for example, information regarding home and working places). The information regarding the sleeping time may be inferred based on the time during which the user terminal 100 is not used.

The preference information may include the user's preference information. For example, the preference information may include information regarding app preferences. The app preferences may be inferred, for example, based on app usage records (for example, time/place-specific usage records). The app preferences may be used to determine an app to be executed according to the user's current state (for example, time, place). As another example, the preference information may include information regarding contact list preferences. The contact list preferences may be inferred by analyzing information regarding how frequently a contact is made with a person on the contact list (for example, frequency of contacts at each time/place). The contact list preferences may be used to determine a person to contact according to the user's current state (for example, the name of repeatedly contacted person). As another example, the preference information may include setting information. The setting information may be inferred by analyzing information regarding how frequently a specific setting value is configured (for example, how frequently a setting value is configured at each time/place). The setting information may be used to configure a specific setting value according to the user's current state (for example, time, place, situation). As another example, the preference information may include place preferences. The place preferences may be inferred, for example, based on records of visits to specific places (for example, time-specific visit records). The place preferences may be used to determine the currently visited place, according to the user's current state (for example, time). As another example, the preference information may include command preferences. The command preferences may be inferred, for example, based on command usage frequencies (for example, time/place-specific use frequencies). The command preferences may be used to determine an instruction pattern to be used according to the user's current state (for example, time, place). Particularly, the command preferences may include information regarding menus most frequently selected by the user in the current state of the app currently executed by analyzing log information.

Figure 9:
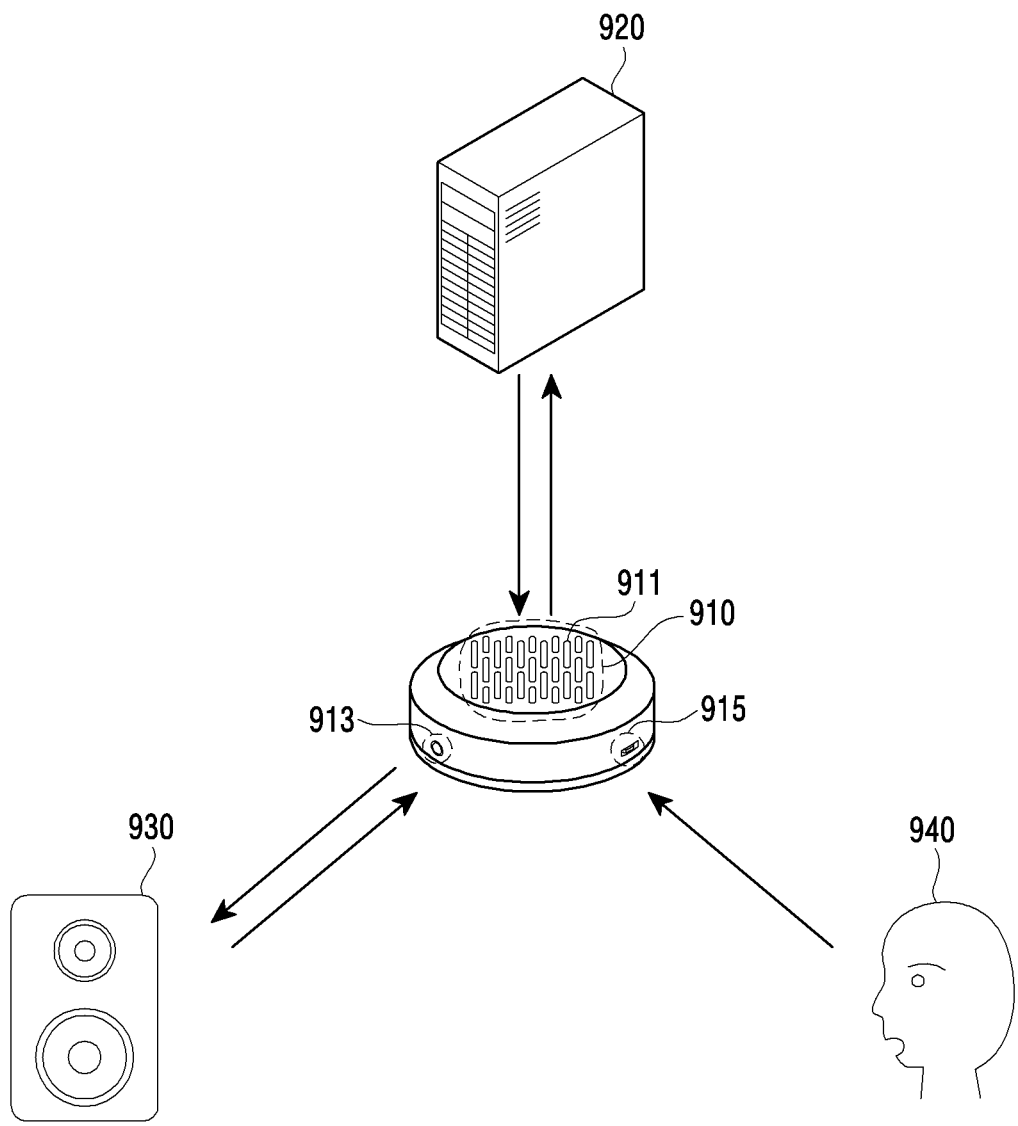
FIG. 9 is a conceptual diagram for describing a system for processing a voice command according to various embodiments of the disclosure.

FIG. 9 is a conceptual diagram for describing a system for processing a voice command according to various embodiments of the disclosure. In the following description, the server 920 may include at least one of the intelligence server 200, the personal information server 300, and the proposal server 400 in FIG. 1.

Referring to FIG. 9, the system for processing a voice command may include an electronic device 910, a server 920, and an audio output device 930. According to an embodiment, the system for processing a voice command may further include multiple electronic devices (not illustrated).

According to various embodiments, the electronic device 910 may include a housing including a circular upper end surface including multiple openings 911, a flat circular lower end surface, and a side surface surrounding a space between the upper end surface and the lower end surface. However, this is not limiting in any manner. For example, the housing may include a polygonal upper end surface, a flat polygonal lower end surface, and a side surface surrounding the space between the upper end surface and the lower end surface. In addition, the multiple openings 911 may be provided on the lower end surface or the side surface of the housing, or may be positioned on at least two of the upper end surface, the lower end surface, and the side surface of the housing.

According to various embodiments, the electronic device 910 may include a microphone for receiving an audio signal occurring near the electronic device 910 (for example, a voice signal from the user 940, an audio signal output through the audio output device 930, or the like). According to an embodiment, the microphone may be positioned inside the housing, and may be disposed to face the multiple openings 911 on the upper end surface of the housing. However, this is not limiting in any manner.

According to various embodiments, the electronic device 910 may include an audio output interface 913 to be connected to the audio output device 930 in a wired or wireless manner. According to an embodiment, the audio output interface 913 may be disposed on the side surface of the housing of the electronic device 910. However, this is not limiting in any manner.

According to various embodiments, the electronic device 910 may include a power input interface 915 for supplying power to the battery of the electronic device 910. According to an embodiment, the power input interface 915 may be disposed on the side surface of the housing of the electronic device 910. However, this is not limiting in any manner.

According to various embodiments, the electronic device 910 may provide a voice recognition service to the user 940. For example, the electronic device 910 may provide a voice recognition service based on a voice signal spoken by the user 940 through the microphone.

According to various embodiments, the electronic device 910 may communicate with the server 920. For example, the electronic device 910 may provide the server 920 with the user's voice signal received through the microphone, and may receive a response to the voice signal from the server 920.

According to various embodiments, the electronic device 910 may be connected to the audio output device 930. For example, the electronic device 910 may be connected to the audio output device 930 in a wired or wireless manner. The electronic device 910 may output an audio signal to the audio output device 930 connected thereto in a wired or wireless manner, thereby providing the user 940 with a voice recognition service.

According to various embodiments, the server 920 may perform communication connection with the electronic device 910. The server 920 may receive a voice signal spoken by the user 940 from the electronic device 910 having communication connection therewith. The server 920 may produce a response to the received voice signal and then transmit the produced response to the electronic device 910. According to an embodiment, the response to the audio signal may be directly transmitted to the electronic device 910 or transmitted to the electronic device 910 via at least one different electronic device (not illustrated).

According to various embodiments, the audio output device 930 may be connected to the electronic device 910 and may output an audio signal transmitted from the electronic device 910. According to an embodiment, the audio output device 930 may provide the electronic device 910 with information regarding the audio output device 930 (for example, information regarding the performance of the audio output device 930) at the timepoint at which the same is connected to the electronic device 910, or may provide the electronic device 910 with information regarding the audio output device 930 if an information request is received from the electronic device 910.

According to various embodiments, the system for processing a voice command may further include at least one different electronic device (not illustrated) having identical or similar capability, characteristics, or attribute as the electronic device 910. According to an embodiment, the at least one different electronic device may include at least one of a desktop computer, a television (TV), a refrigerator, a washing machine, an air conditioner, a smart light, a large format display (LFD), a digital signage, a mirror display, a smartphone, a tablet computer, a laptop computer, a portable game console, a portable music player, or a vacuum cleaner.

According to various embodiments, electronic device 910 may perform bilateral communication or unilateral communication with the at least one different electronic device.

Figure 10:
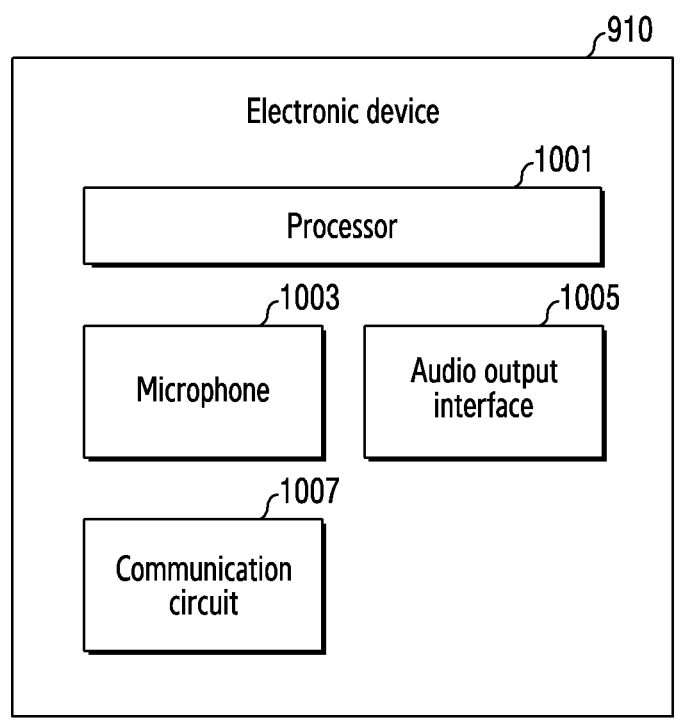
FIG. 10 is a block diagram of an electronic device according to various embodiments of the disclosure.

FIG. 10 is a block diagram of an electronic device according to various embodiments of the disclosure.

Referring to FIG. 10, the electronic device 910 may include a processor 1001, a microphone 1003, an audio output interface 1005, and a communication circuit 1007. According to an embodiment, the electronic device 910 may further include additional elements besides the elements included in FIG. 10. For example, the electronic device 910 may further include at least one of a memory (not illustrated), a display (not illustrated), or a power input interface (not illustrated).

According to various embodiments, the processor 1001 may control the overall action of the electronic device 910. In order to control the overall action of the electronic device 910, the processor 1001 may be operatively coupled to other elements such as the microphone 1003, the audio output interface 1005, the communication circuit 1007, and the memory (not illustrated).

According to various embodiments, the processor 1001 may include one processor core or may include multiple processor cores. For example, the processor 1001 may include a multi-core such as a dual-core, a quad-core, or a hexa-core. According to an embodiment, the processor 1001 may further include a cache memory positioned inside or outside the processor 1001.

According to various embodiments, the processor 1001 may receive a command from other elements of the electronic device 910, may interpret the received command, and may perform calculation or process data according to the interpreted command.

According to various embodiments, the processor 1001 may process data or signals occurring in the electronic device 910. For example, the processor 1001 may request the memory (not illustrated) to provide an instruction (or data or signal). The processor 1001 may record (or store) or update an instruction (or data or signal) in the memory in order to control the electronic device 910 or another element in the electronic device 910.

According to various embodiments, the processor 1001 may interpret data, an instruction, or a signal received from the microphone 1003, the audio output interface 1005, the communication circuit 1007, the memory (not illustrated), or the like, and may process the same. The processor 1001 may provide the received data, instruction, or signal to the microphone 1003, the audio output interface 1005, the communication circuit 1007, or the like.

According to various embodiments, the processor 1001 may include at least one processor. For example, the processor 1001 may include at least one of an application processor (AP) configured to control an upper-layer program such as an application, a communication processor (CP) configured to control a communication-related function, or an audio codec chip configured to control encoding and decoding related to audio signals. According to an embodiment, the audio codec chip configured to control encoding and decoding related to audio signals may be separated from the processor 1001 and disposed as a separate element.

According to various embodiments, the processor 1001 may receive an audio signal from the microphone 1003. For example, the processor 1001 may receive a voice signal spoken by the user (for example, user 940) through the microphone 1003. According to an embodiment, the voice signal may include a wake-up command (or wake word) (for example, "Hey XXX" or "Hi XXX"). The wake-up command may be used as an instruction for waking up the electronic device 910 operating in a sleep mode. The sleep mode may refer to a mode in which at least one of the elements of the electronic device 910 is deactivated. According to an embodiment, the voice signal may include a voice command (for example, "How is the weather today?" or "What time is it now"). The voice command may be related to the purpose or reason why the voice signal was caused by the user. For example, the voice command may include information regarding the service that the user wants to receive through the electronic device 910. According to an embodiment, the voice signal may include both a wake-up command and a voice command. For example, the voice signal may include both a wake-up command and a voice command, such as "Hi XXX how is the weather today?").

According to various embodiments, the processor 1001 may recognize (or identify) a wake-up command from the audio signal received through the microphone 1003. The processor 1001 may compare the audio signal received through the microphone 1003 with a wake-up command prestored in the memory (not illustrate), thereby recognizing a wake-up command. When the wake-up command is recognized, the processor 1001 may produce information related to reception of the wake-up command. The information related to reception of the wake-up command may include information indicating that the wake-up command is received and information regarding the quality of the wake-up command. The information regarding the quality of the wake-up command may include at least one of information regarding the loudness of the wake-up command received through the microphone 1003, information regarding the degree of matching between the wake-up command received through the microphone 1003 and a wake-up command prestored in the memory (not illustrated) of the electronic device 910, or information regarding the signal-to-noise ratio between the wake-up command received through the microphone 1003 and an audio signal (considered as noise) received through the microphone 1003 for a designated period of time before or after reception of the wake-up command. According to an embodiment, the information related to reception of the wake-up command may further include at least one of identification information of the electronic device 910, registration account information of the electronic device 910, registration position information (for example, living room, kitchen, bedroom, or the like) of the electronic device 910, information regarding an audio output device (for example, audio output device 930) connected to the electronic device 910 (for example, information regarding the performance of the audio output device), or information regarding whether or not the audio output device is connected thereto.

According to various embodiments, the processor 1001 may transmit information regarding a wake-up command to a server (for example, server 920) through the communication circuit 1007. When information related to reception of a wake-up command is received, the server may produce a response to the received information and may provide the same to the electronic device 910. The response to the received information may include information for producing a first audio signal of a non-language sound (for example, signal sound) (or language sound) indicating that the electronic device 910 has been determined as an input/output device (or indicating that the electronic device 910 has been activated). According to an embodiment, if the server additionally receives information related to reception of a wake-up command from at least one different electronic device registered with the same registration account as the registration account of the electronic device 910 within a designated period of time after information related to reception of a wake-up command is received from the electronic device 910, then the server may determine one of the electronic device 910 and the at least one different electronic device as an input/output device based on information received from each electronic device. The server may transmit a response to the information related to reception of a wake-up command to the determined input/output device.

According to various embodiments, the processor 1001 may receive a response to information related to reception of a wake-up command from the server (for example, server 920) through the communication circuit 1007. Based on the response received from the server, the processor 1001 may produce a first audio signal indicating that the electronic device 910 is determined as an input/output device (or indicating that the electronic device 910 is woken up). The processor 1001 may output the produced first audio signal through the audio output interface 1005. The first audio signal output through the audio output interface 1005 may be provided to the audio output device (for example, audio output device 930) connected to the electronic device 910 and then output as a sound.

According to various embodiments, the processor 1001 may transmit a voice command received through the microphone 1003 to the server (for example, server 920) through the communication circuit 1007. For example, the processor 1001 may transmit a voice command such as "How is the weather today?" to the server through the communication circuit 1007. In this case, the server may produce a response to the voice command received from the electronic device 910. For example, the server may acquire information regarding today's weather (for example, sunny) from another electronic device and may produce a response to be provided to the electronic device 910 based on the acquired information.

According to various embodiments, the processor 1001 may receive the response to the voice command from the server (for example, server 920) through the communication circuit 1007. The processor 1001 may produce a second audio signal (for example, "It is sunny today") based on the received response. The processor 1001 may output the second audio signal through the audio output interface 1005. The second audio signal output through the audio output interface 1005 may be provided to the audio output device (for example, audio output device 930) and then output.

According to various embodiments, if the electronic device 910 is in a state in which the same cannot provide a voice recognition service to the user, the processor 1001 may transmit a signal requesting replacement of the input/output device to the server (for example, server 920) through the communication circuit 1007. The state in which the electronic device 910 cannot provide a voice recognition service to the user may include at least one of a state in which the audio output device (for example, audio output device 930) connected to the electronic device 910 outputs an audio signal with a level of loudness too low to be heard by a person, a state in which the audio output device connected to the electronic device is powered off, or a state in which the electronic device and the audio output device are disconnected. When the processor 1001 has transmitted a signal requesting replacement of the input/output device to the server, the processor 1001 may switch the operating mode of the electronic device to a sleep mode.

According to various embodiments, the microphone 1003 may be used to receive an audio signal occurring outside the electronic device 910. For example, the microphone 1003 may receive a voice signal spoken by the user (for example, user 940) related to the electronic device 910, an audio signal output by the audio output device (for example, audio output device 930) connected to the electronic device 910, or the like. The microphone 1003 may provide the received audio signal to the processor 1001.

According to various embodiments, the audio output interface 1005 may be used to connect with the audio output device (for example, audio output device 930) in a wired or wireless manner. For example, the audio output interface 1005 may include a circuit for at least one of a Bluetooth communication technique, a Bluetooth low energy (BLE) communication technique, or a wireless fidelity (Wi-Fi) communication technique, or may include a circuit for a wired communication technique.

According to various embodiments, the communication circuit 1007 may be used to produce or establish a communication path between the server (for example, server 920) or another electronic device. For example, the communication circuit 1007 may include a circuit for at least one of a Bluetooth communication technique, a Bluetooth low energy (BLE) communication technique, a wireless fidelity (Wi-Fi) communication technique, a cellular (or mobile) communication technique, or a wired communication technique. The communication circuit 1007 may provide the processor 1001 with a signal, information, data, or a message received from the other electronic device. The communication interface 1007 may transmit a signal, information, data, or a message provided from the processor 1001 to the server or the other electronic device.

Figure 11:
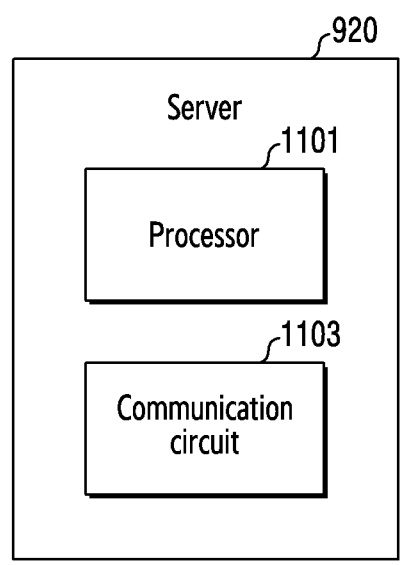
FIG. 11 is a block diagram of a server according to various embodiments of the disclosure.

FIG. 11 is a block diagram of a server according to various embodiments of the disclosure.

Referring to FIG. 11, the server 920 may include a processor 1101 and a communication circuit 1103. According to an embodiment, the server 920 may further include an additional element besides the elements included in FIG. 11. For example, the server 920 may further include an element such as a memory (not illustrated).

According to various embodiments, the processor 1101 may control the overall action of the server 920. In order to control the overall action of the server 920, the processor 1101 may be operatively coupled to elements such as a communication circuit 1103 and a memory (not illustrated).

According to various embodiments, the processor 1101 may include one processor core or may include multiple processor cores. For example, the processor 1101 may include a multi-core such as a dual-core, a quad-core, or a hexa-core. According to an embodiment, the processor 1101 may further include a cache memory positioned inside or outside the processor 1001.

According to various embodiments, the processor 1101 may receive a command from other elements of the server 920, may interpret the received command, and may perform calculation or process data according to the interpreted command.

According to various embodiments, the processor 1101 may process instructions, data, or signals occurring in the server 920. For example, the processor 1101 may request the memory (not illustrated) to provide an instruction, data or a signal. The processor 1101 may record (or store) or update an instruction, data, or a signal in the memory in order to control the server 920 or another element in the server 920.

According to various embodiments, the processor 1101 may interpret an instruction, data, or a signal received from the communication circuit 1103, the memory (not illustrated), and the like, and may process the same. The processor 1101 may produce a new instruction, data, or signal based on the received instruction, data, or signal. The processor 1101 may provide the processed or produced instruction, data, or signal to the communication circuit 1103, the memory, or the like.

According to various embodiments, the processor 1101 may receive information related to reception of a wake-up command from the electronic device through the communication circuit 1103. The processor 1101 may produce a response to the information related to reception of a wake-up command, in response to receiving the information related to reception of a wake-up command from the electronic device. For example, the processor 1101 may produce a response including information for producing a first audio signal of a non-language sound indicating that the electronic device has been determined as an input/output device. According to an embodiment, the processor 1101 may receive information related to reception of a wake-up command from each of multiple electronic devices registered with the same registration account information through the communication circuit 1103. The processor 1101 may determine one of the multiple electronic devices as an input/output device, based on information received from each of the multiple electronic devices. For example, the processor 1101 may identify the quality (for example, loudness, degree of matching, or the like) of the wake-up command received by each electronic device, based on the information received from each of the multiple electronic devices. The processor 1101 may determine one of the multiple electronic devices, which has received a wake-up command having the best quality, as an input/output device. The processor 1101 may produce a response to the information received from the electronic device determined as the input/output device, and then transmit the produced information to the electronic device determined as the input/output device through the communication circuit 1103.

According to various embodiments, the processor 1101 may receive a voice command (for example, "What time is it now?") from the electronic device (for example, electronic device 910) through the communication circuit 1103. The processor 1101 may produce a response to the voice command in response to reception of the voice command. For example, the processor 1101 may acquire information (for example, 10 AM) related to the voice command from another electronic device. The processor 1101 may produce a response to the voice command based on the acquired information, and may transmit the produced response to the electronic device through the communication circuit 1103.

According to various embodiments, the processor 1101 may receive a signal requesting replacement of the input/output device from the electronic device (for example, electronic device 910) determined as the input/output device through the communication circuit 1103. The processor 1101 may replace the input/output device with one of multiple electronic devices that transmitted information regarding reception of a wake-up command, other than the electronic device that requested replacement of the input/output device. For example, the processor 1101 may replace the input/output device with an electronic device that received a wake-up command having the best quality, among the other electronic devices. The processor 1101 may transmit, through the communication circuit 1103, a response to the voice command to the electronic device replacing the input/output device.

According to various embodiments, the communication circuit 1103 may be used to produce or establish a communication path between the server 920 and at least one electronic device (for example, electronic device 920). For example, the communication circuit 1103 may include a circuit for at least one of a wireless fidelity (Wi-Fi) communication technique, a cellular or mobile communication technique, or a wired communication technique. The communication circuit 1103 may provide the processor 1101 with a signal, information, data, or a message received from the electronic device. The communication circuit 1103 may transmit a signal, information, data, or a message provided from the processor 1101 to the electronic device.

According to various embodiments of the disclosure, an electronic device (for example, electronic device 910) may include: a housing including a circular upper end surface including multiple openings (for example, openings 911) having a selected pattern, a flat circular lower end surface, and a side surface surrounding a space between the upper end surface and the lower end surface; an audio output interface (for example, audio output interface 913 or 1005) formed on the side surface; a power input interface (for example, power input interface 915) formed on the side surface; a microphone positioned inside the housing so as to face the openings; a wireless communication circuit (for example, communication circuit 1007); a processor operatively connected to the audio output interface, the power input interface, the microphone (for example, microphone 1003), and the communication circuit; and a memory operatively connected to the processor. The memory may be configured to store instructions that, when executed, cause the processor to: receive a wake-up command through the microphone; recognize the wake-up command; transmit information related to reception of the wake-up command to a server through the communication circuit; receive a response from the server through the communication circuit; produce, based on the response, a first audio signal; and output the first audio signal through the audio output interface while the microphone is available. The audio signal may be a non-language sound.

According to various embodiments, the instructions may be configured to cause the processor to: receive a non-language sound through the microphone after the first audio signal is output; determine whether or not the non-language sound and the first audio signal at least partially match with each other; and transmit information regarding the determination to the server through the communication circuit.

According to various embodiments, the information related to reception of the wake-up command may include information indicating that the wake-up command is received and information regarding quality of the wake-up command.

According to various embodiments, the information regarding quality of the wake-up command may include at least one of loudness of the wake-up command received through the microphone, degree of matching between the wake-up command received through the microphone and a wake-up command prestored in the memory, and a signal-to-noise ratio between the wake-up command received through the microphone and an audio signal received through the microphone before or after reception of the wake-up command.

According to various embodiments, the information related to reception the wake-up command may further include at least one of identification information of the electronic device through the communication circuit, registration account information of the electronic device, registration position information of the electronic device, and information regarding an audio output device connected to the electronic device.

According to various embodiments, the instructions may be configured to cause the processor to: receive a voice command through the microphone; transmit the voice command to the server through the communication circuit; produce a second audio signal, when a response to the voice command is received from the server through the communication circuit, based on the response; and output the second audio signal through the audio output interface. The second audio signal may be a non-language sound or a language sound.

According to various embodiments, the instructions may be configured to cause the processor to output a third audio signal through the audio output interface, when no response to the voice command is received from the server, so as to inform that information regarding the voice command cannot be provided. The third audio signal may be an audio signal prestored in the memory.

According to various embodiments, the electronic device may be connected to an audio output device through the audio output interface. The instructions may be configured to cause the processor to: transmit, when the electronic device and the audio output device are disconnected, information indicating disconnection from the audio output device and a signal requesting a change of an input/output device to the server through the communication circuit; and switch an operating mode of the electronic device to a sleep mode.

According to various embodiments, a server (for example, server 920) may include: a communication circuit (for example, communication circuit 1103); a processor (for example, processor 1101) operatively connected to the communication circuit; and a memory operatively connected to the processor. The memory may be configured to cause, when executed, cause the processor to: receive information related to reception of a wake-up command from each of multiple electronic devices through the communication circuit; determine a first electronic device among the multiple electronic devices as an input/output device based on the information; produce a response to the information; and transmit the response to the first electronic device through the communication circuit. The information may include information indicating that the wake-up command is received and information indicating quality of the wake-up command.

According to various embodiments, the information regarding quality of the wake-up command may include at least one of loudness of the wake-up command received through a microphone of the electronic device, degree of matching between the wake-up command received through the microphone of the electronic device and a wake-up command prestored in the electronic device, and a signal-to-noise ratio between the wake-up command received through the microphone of the electronic device and an audio signal received through the microphone before or after reception of the wake-up command.

Figure 12:
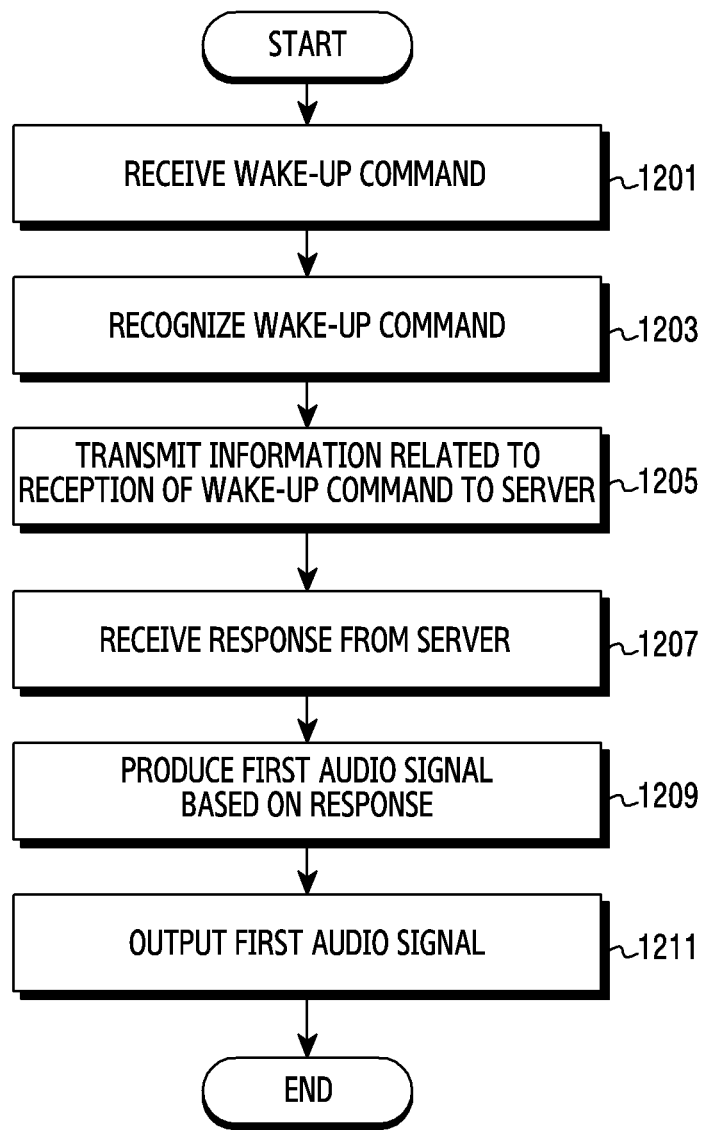
FIG. 12 is a flowchart for describing a method for waking up an electronic device according to various embodiments of the disclosure.

FIG. 12 is a flowchart for describing a method for waking up an electronic device according to various embodiments of the disclosure.

Referring to FIG. 12, in operation 1201, the processor (for example, processor 1001) of the electronic device (for example, electronic device 910) may receive a wake-up command. For example, the processor may receive a wake-up command (for example, "Hey XXX" or "Hi XXX") spoken by the user (for example, user 940) by using the microphone (for example, microphone 1003) provided in the electronic device while the electronic device operates in the sleep mode. The speed mode, as used herein, may include a mode in which at least some elements of the electronic device are deactivated in order to reduce power consumed by the electronic device. The wake-up command refers to a predefined voice command for waking up the electronic device operating in the sleep mode, and may be preconfigured by the product seller or developer or configured and changed by the user.

In operation 1203, the processor may recognize the wake-up command. For example, the processor may compare a wake-up command received through the microphone with a wake-up command prestored in the memory of the electronic device, thereby identifying the degree of matching between the two wake-up commands. The processor may confirm, if the degree of matching between the two wake-up commands is equal to or higher than a first threshold, that a wake-up command has been recognized. The first threshold refers to a reference value for determining whether or not a wake-up command is received, and may be configured or changed by the manufacturer, developer, or user. When a wake-up command has been recognized, the processor may wake up the electronic device (for example, activate elements of the electronic device deactivated in the sleep mode). According to an embodiment, when a wake-up command has been recognized, the processor may produce information indicating that a wake-up command is received and information regarding the quality of the wake-up command. The information regarding quality of the wake-up command may include at least one of information regarding the loudness of the wake-up command received through the microphone, information regarding the degree of matching between the wake-up command received through the microphone and the wake-up command prestored in the memory, or information regarding the signal-to-noise ratio between the wake-up command received through the microphone and an audio signal (audio signal considered as noise) received through the microphone for a designated period of time before or after reception of the wake-up command.

In operation 1205, the processor may transmit information related to reception of a wake-up command to the server (for example, server 920). For example, the processor may transmit, through the communication circuit (for example, communication circuit 1007), at least one of information indicating that a wake-up command is received or information regarding the quality of the wake-up command. According to an embodiment, the information related to reception of a wake-up command may further include at least one of identification information of the electronic device, registration account information of the electronic device, registration position information (for example, living room, kitchen, bedroom, or the like) of the electronic device, information regarding an audio output device (for example, audio output device 930) connected to the electronic device (for example, information regarding the performance of the audio output device), or information regarding whether or not the audio output device is connected thereto. The information regarding the audio output device may be received from the audio output device through the audio output interface (for example, audio output interface 1005) when the electronic device and the audio output device are connected through the communication interface.

In operation 1207, the processor may receive a response from the server through the communication circuit. For example, the processor may receive information indicating that the electronic device has been selected as an input/output device (or indicating that the electronic device has woken up) from the server through the communication circuit. The information indicating that the electronic device has been selected as an input/output device may include information used to produce a first audio signal for informing the user of the electronic device that the electronic device has been selected as an input/output device.

In operation 1209, the processor may produce a first audio signal based on the response received from the server. For example, upon receiving information indicating that the electronic device has been selected as an input/output device through the communication circuit, the processor may produce (or identify) a non-language sound (for example, signal sound) based on the received information. As another example, upon receiving information indicating that the electronic device has been selected as an input/output device through the communication circuit, the processor may produce (or identify) a language sound (for example, "Hello") based on the received information.

In operation 1211, the processor may output a first audio signal through the audio output interface. The first audio signal output through the audio output interface may be provided to the audio output device connected to the electronic device through the audio output interface. The first audio signal provided to the audio output device may be output as a sound through the audio output device. Accordingly, the user of the electronic device may hear the first audio signal output through the audio output device, thereby recognizing that the electronic device connected to the audio output device has woken up. In addition, if there exist multiple electronic devices capable of processing a voice command near the user of the electronic device, the user may recognize that the electronic device connected to the audio output device outputting the first audio signal, among the multiple electronic devices, has been selected as an input/output device. According to an embodiment, if the processor has a light-emitting diode (LED), the LED provided in the electronic device may be turned on concurrently with outputting the first audio signal, thereby providing the user with an additional notification.

It has been assumed in the above description of operations that the electronic device receives only a wake-up command through the microphone, but the electronic device may also receive an audio signal including both a wake-up command and a voice command through the microphone, according to various embodiments of the disclosure. In this case, the electronic device may compare the audio signal with a wake-up command prestored in the memory, thereby identifying each of the wake-up command part and the voice command part. The processor may store the identified voice command part in the memory. When the first audio signal is normally output by the audio output device connected to the electronic device, the processor may transmit a voice command stored in the memory to the server through the communication circuit.

Although operations (for example, operations 1207 to 1211) corresponding to a case in which the electronic device has been selected as an input/output device have been described above, the electronic device may not be selected as an input/output device according to various embodiments of the disclosure. For example, if there exists an external electronic device that received a wake-up command having a better quality than the quality of the wake-up command received by the electronic device, the electronic device may receive a signal requesting switching to the sleep mode from the server. The electronic device may switch to the sleep mode in response to receiving the signal requesting switching to the sleep mode.

Figure 13:
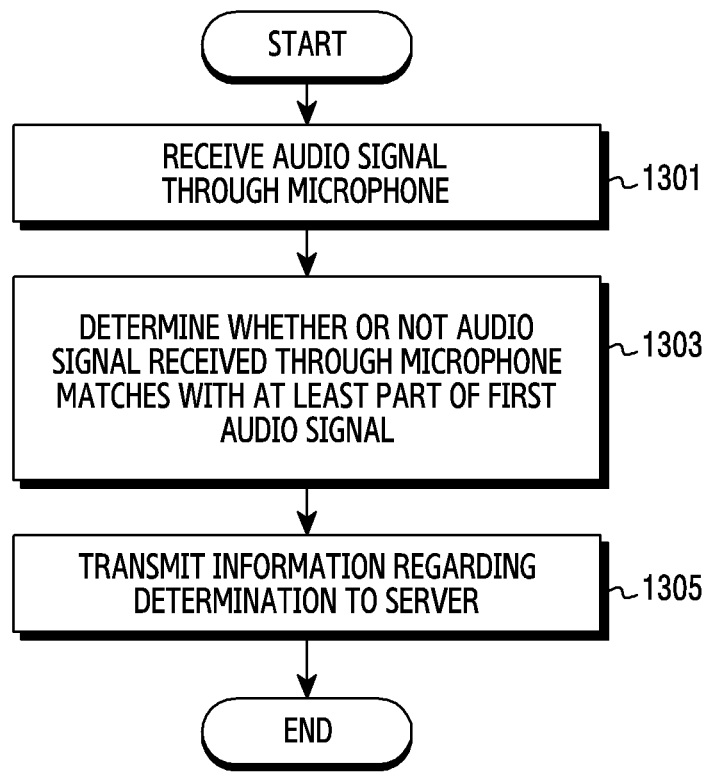
FIG. 13 is a flowchart for describing a method for determining the state of an audio output device connected to an electronic device according to various embodiments of the disclosure.

FIG. 13 is a flowchart for describing a method for determining the state of an audio output device connected to an electronic device according to various embodiments of the disclosure.

Referring to FIG. 13, in operation 1301, the processor (for example, processor 1001) of the electronic device (for example, electronic device 910) may receive an audio signal through the microphone (for example, microphone 1003). For example, when the processor has output a first audio signal through the audio output interface as in the case of operation 1211 in FIG. 12, the processor may receive an audio signal occurring near the electronic device for a designated period of time by using the microphone.

In operation 1303, the processor may determine whether or not an audio signal received through the microphone matches with at least a part of the first audio signal. The first audio signal cannot be recognized by the user if the audio output device connected to the electronic device is powered off, or if the volume size has been configured by the user's setting to be too small to be recognized by the user. Accordingly, the processor may identify the degree of matching between the audio signal received through the microphone and the first audio signal, in order to determine whether or not the audio output device can normally output the first audio signal in the current state. If the identified degree of matching is equal to or higher than a second threshold, the processor may confirm that the first audio signal is normally output through the audio output device. If the identified degree of matching is lower than the second threshold, the processor may confirm that the first audio signal is not normally output through the audio output device. The second threshold, as used herein, refers to a reference value for confirming whether or not the first audio signal is normally output, and may be configured or changed by the manufacturer, developer, or user.

In operation 1305, the processor may transmit information regarding the determination to the server through the communication circuit. For example, the processor may transmit information indicating that the degree of matching between the audio signal received through the microphone and the first audio signal is equal to or higher than the second threshold to the server (for example, server 930) through the communication circuit (for example, communication circuit 1007). In this case, the server may confirm that the first audio signal is normally output by the audio output device connected to the electronic device. As another example, the processor may transmit, to the server, information indicating that the degree of matching between the audio signal received through the microphone and the first audio signal is lower than the second threshold, and may switch to the sleep mode. In this case, the server may confirm that the first audio signal is not normally output by the audio output device connected to the electronic device. When the first audio signal is not normally output by the audio output device connected to the electronic device, the server may replace the input/output device with one of other electronic devices that received the wake-up command spoken by the user of the electronic device, and may transmit a signal indicating that the input/output device will be replaced with the selected electronic device.

It has been assumed in the above description that, if the degree of matching between the audio signal received through the microphone and the first audio signal is equal to/higher than the second threshold or lower than the same, the electronic device transmits information related thereto to the server. However, according to various embodiments of the disclosure, the electronic device may transmit information related thereto to the server only if the degree of matching with the first audio signal is lower than the second threshold.

Figure 14:
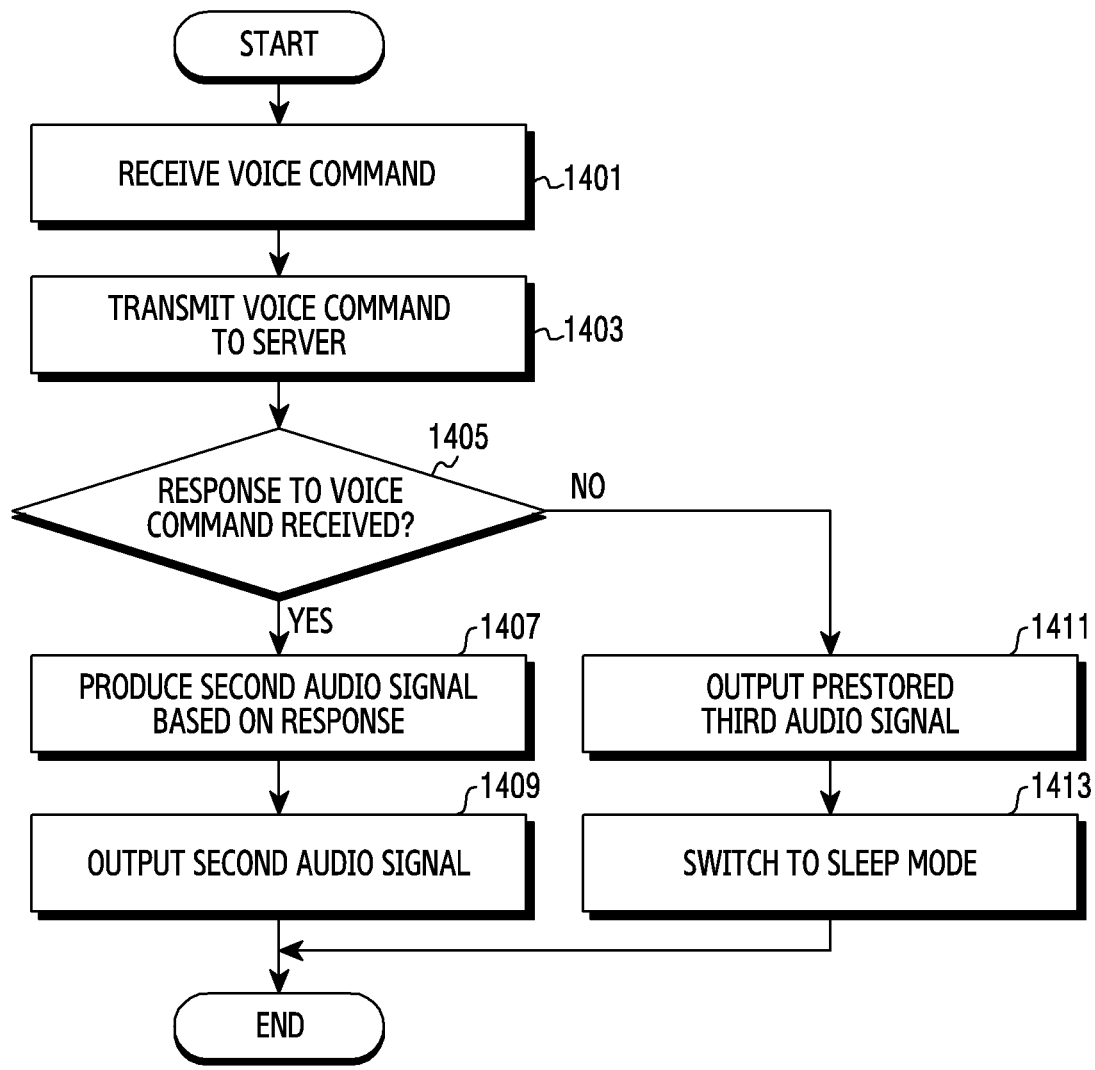
FIG. 14 is a flowchart for describing a method for processing a voice command in connection with an electronic device that has woken up according to various embodiments of the disclosure.

FIG. 14 is a flowchart for describing a method for processing a voice command in connection with an electronic device that has woken up according to various embodiments of the disclosure.

Referring to FIG. 14, in operation 1401, the processor (for example, processor 1001) of the electronic device (for example, electronic device 910) may receive a voice command through the microphone (for example, microphone 1003). For example, the processor may transmit information indicating that the degree of matching between the audio signal received through the microphone and the first audio signal is equal to or higher than the second threshold to the server (for example, server 930) in operation 1205 of FIG. 12, and may then receive a voice command spoken by the user through the microphone (for example, "How is the weather today?", "What time is it now?", or "Play classical music").

In operation 1403, the processor may transmit the voice command to the server (for example, server 920) through the communication circuit (for example, communication circuit 1007).

In operation 1405, the processor may confirm whether or not a response to the voice command is received from the server through the communication circuit. For example, after transmitting a voice command to the server, the processor may confirm whether or not a response to the voice command is received within a designated period of time.

If a response to the voice command is received from the server through the communication circuit in operation 1405, the processor may produce a second audio signal based on the received response in operation 1407. The second audio signal may be a non-language sound or a language sound. For example, the second audio signal may include a response to the user's voice command (for example, "it is sunny today", "It is 10 AM", classical music, or the like).

In operation 1409, the processor may output the second audio signal through the audio output interface (for example, audio output interface 1005). The second audio signal may be provided to the audio output device (for example, audio output device 930) connected to the electronic device through the audio output interface. The second audio signal provided to the audio output device may be output as a sound. Accordingly, the user of the electronic device may hear a response to the spoken voice command. According to an embodiment, the second audio signal may include a specific audio signal (for example, an audio signal in the inaudible frequency band) that can be used to confirm whether or not the second audio signal is normally output by the audio output device. In this case, the processor may receive audio signals occurring near the electronic device periodically or aperiodically through the microphone while the second audio signal is output. The processor may confirm, if the received audio signal includes the specific audio signal, that the second audio signal is normally output. The processor may confirm, if the second audio signal does not include the specific audio signal, that the second audio signal is not normally output, and may transmit a signal requesting replacement of the input/output device to the server through the communication circuit.

When no voice command is received from the server through the communication circuit in operation 1405, the processor may output a third audio signal prestored in the memory of the electronic device in operation 1411. The third audio signal, which is a non-language sound (or language sound), may differ from the first audio signal and may be output as a sound through the audio output device. Accordingly, the user of the electronic device may hear the third audio signal output through the audio output device, thereby recognizing that the electronic device will switch to the sleep mode instead of providing a voice recognition service.

In operation 1413, the processor may switch to the sleep mode. For example, the processor may switch the operating mode of the electronic device to the sleep mode.

It has been assumed in the above description that, in operation 1405, the electronic device transmits a voice command to the server and, according to whether or not a response to the voice command is received within a designated period of time, performs operation 1407 or operation 1411. However, according to various embodiments of the disclosure, the electronic device may perform operation 1407 if a response to the voice command is received from the server and may perform operation 1411 if a sleep mode switching request is received from the server.

It has been assumed in the above description that the response to the voice command includes information for producing the second audio signal. However, according to various embodiments of the disclosure, the response to the voice command may include information for producing a notification in a different format, depending on the element of the electronic device. For example, if the electronic device includes a display, the response to the voice command may include information for producing visual notification information.

Figure 15:
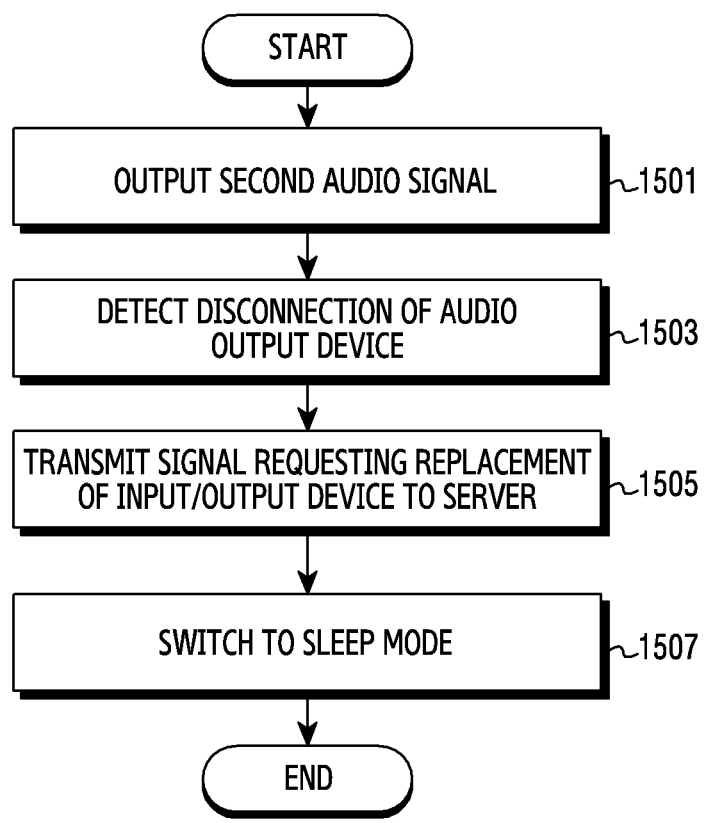
FIG. 15 is a flowchart for describing a method for requesting replacement of an input/output device in connection with an electronic device according to various embodiments of the disclosure.

FIG. 15 is a flowchart for describing a method for requesting replacement of an input/output device in connection with an electronic device according to various embodiments of the disclosure.

Referring to FIG. 15, in operation 1501, the processor (for example, processor 1001) of the electronic device (for example, electronic device 910) may output a second audio signal through the audio output interface (for example, audio output interface 1005). For example, the processor may output a response to a voice command spoken by the user (for example, user 940) through the audio output device (for example, audio output device 920), as in the case of operation 1409 in FIG. 14.

In operation 1503, the processor may detect disconnection of the audio output device. For example, the processor may detect disconnection of the audio output device connected through the audio output interface in a wired or wireless manner, while or after outputting the second audio signal through the audio output interface.

In operation 1505, the processor may transmit a signal requesting replacement of the input/output device to the server. In this case, in response to receiving the signal requesting replacement of the input/output device from the electronic device, the server may replace the input/output device with an electronic device other than the electronic device, among multiple electronic devices that received a wake-up command spoken by the user. The server may transmit, to the other electronic device replacing the input/output device, information indicating that the same has been selected as the input/output device, or a response to the user's voice command. Accordingly, even if the electronic device is unable to process the voice command and thus makes the service unavailable, the user of the electronic device can use the voice recognition service through the other electronic device.

In operation 1507, the processor may switch to the sleep mode. For example, the processor may deactivate at least some elements of the electronic device.

Figure 16:
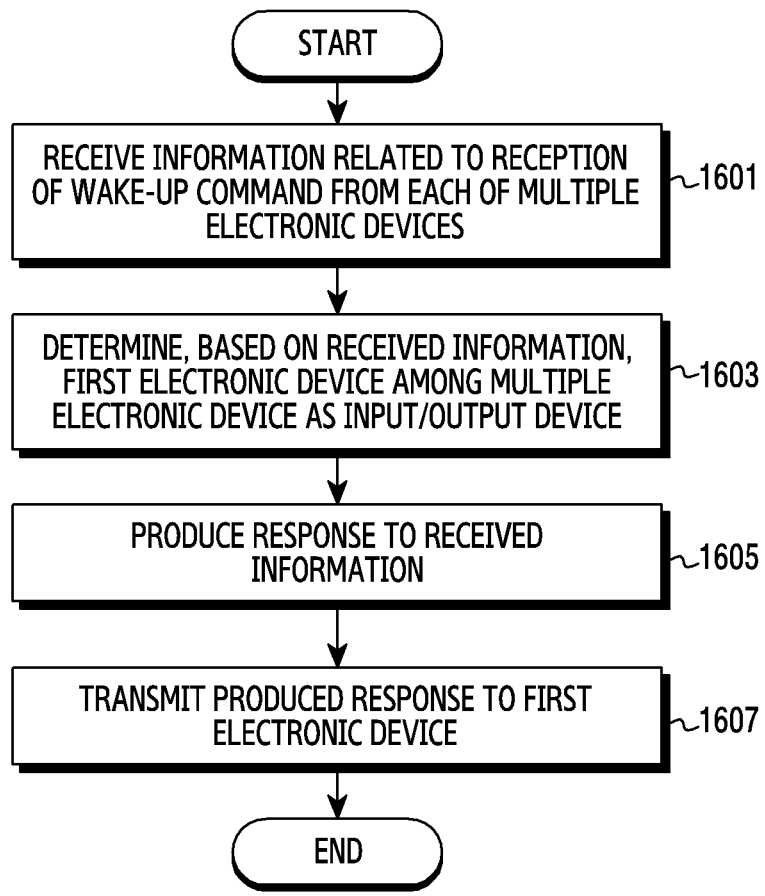
FIG. 16 is a flowchart for describing a method for determining an input/output device to process a voice command in connection with a server according to various embodiments of the disclosure.

FIG. 16 is a flowchart for describing a method for determining an input/output device to process a voice command in connection with a server according to various embodiments of the disclosure. In the following description, each of multiple electronic devices may include an electronic device identical or similar to the electronic device 910 in FIG. 9.

Referring to FIG. 16, in operation 1601, the processor (for example, processor 1101) of the server (for example, server 920) may receive information related to reception of a wake-up command from each of multiple electronic device through the communication circuit (for example, communication circuit 1103). For example, the processor may receive information related to reception of a wake-up command from the first electronic device through the communication circuit. After receiving the information related to reception of a wake-up command from the first electronic device, the processor may additionally receive information related to reception of a wake-up command from at least one electronic device (for example, second or third electronic device) registered with the same registration account as the first electronic device for a designated period of time. For example, the processor may identify the registration account information of the first electronic device, based on the information related to reception of a wake-up command received from the first electronic device. After receiving the information related to reception of a wake-up command from the first electronic device, the processor may additionally receive information related to reception of a wake-up command from at least one electronic device through the communication circuit for a designated period of time. By identifying the registration account information of the electronic device included in the additionally received information, the processor may identify information transmitted by at least one electronic device registered with the same registration account as the first electronic device, among the additionally received information. The information related to reception of a wake-up command may include information indicating that the wake-up command is received, information regarding the quality of the wake-up command, or registration account information of the electronic device. According to an embodiment, the information related to reception of a wake-up command may include, instead of the registration account information of the electronic device, identification information of the electronic device or registration position information of the electronic device. In this case, the processor may acquire registration account information of the electronic device, based on the identification information of the electronic device or the registration position information of the electronic device. According to an embodiment, the information related to reception of a wake-up command may additionally include, besides the above-mentioned pieces of information, at least some of information regarding the audio output device connected to the electronic device or information regarding whether or not the audio output device is connected thereto.

In operation 1603, the processor may determine the first electronic device among the multiple electronic devices (for example, first electronic device, second electronic device, and third electronic device) as an input/output device, based on the received information. For example, the processor may identify information regarding the quality of a wake-up command received by each of the electronic devices from information related to reception of a wake-up command transmitted by each of the multiple electronic devices. Based on the identified information, the processor may determine the first electronic device, which received a wake-up command having the best quality, among the multiple electronic devices as an input/output device. According to an embodiment, if the information related to reception of a wake-up command includes information regarding the audio output device connected to the electronic device, the processor may determine the input/output device based on the information regarding the audio output device. For example, the processor may identify information regarding the audio output device connected to each electronic device (for example, information regarding the audio output performance of the audio output device, information regarding whether or not the audio output device is connected, or the like) from information related to reception of a wake-up command transmitted by each of the multiple electronic devices. Based on the identified information, the processor may determine the first electronic device, which has the best audio output performance of the audio output device among the multiple electronic devices, as the input/output device. As another example, the processor may identify information regarding the audio output device connected to each electronic device from information related to reception of a wake-up command transmitted by each of the multiple electronic devices. The processor may determine the first electronic device, which is solely connected to the audio output device among the multiple electronic devices, as the input/output device. According to an embodiment, if the information related to reception of a wake-up command includes information regarding the registration position information of the electronic device, the processor may exclude some of the multiple electronic devices, based on the number of electronic devices with regard to respective registration positions, when determining the input/output device. For example, if the registration position of the first electronic device and the second electronic device is "living room", and if the registration position of the third electronic device is "kitchen", the server may exclude the third electronic device when determining the input/output device.

In operation 1605, the processor may produce a response to the information received from the first electronic device. The response to the information received from the first electronic device may include information that may be used to produce a first audio signal for informing the user that the first electronic device is determined as an input/output device. The first audio signal may be an audio signal of a non-language sound (for example, signal sound). According to an embodiment, the response to the information received from the first electronic device may additionally include, besides the information that may be used to produce the first audio signal, information that may be used to produce notification information in a different format. For example, if the first electronic device includes a display or is connected to a display device, the response to the information received from the first electronic device may additionally include information that may be used to produce a type of information (for example, text information, image information, or the like) that may be displayed on the display of the first electronic device or the display device connected to the first electronic device.

In operation 1607, the processor may transmit the produced response to the first electronic device through the communication circuit. In this case, the first electronic device may produce a first audio signal based on the response received from the server and then output the first audio signal through the audio output device connected to the first electronic device. Accordingly, the user (for example, user 910) may hear the first audio signal output by the first electronic device among the multiple electronic devices, thereby recognizing that the first electronic device has been determined as the input/output device to process the voice command.

It has been assumed in the above description that the server performs operation 1603 and then performs operation 1605. However, according to various embodiments of the disclosure, the server may perform operation 1603 and operation 1605 simultaneously, or may perform operation 1605 and then operation 1603. For example, upon receiving information related to reception of a wake-up command from each of multiple electronic devices including the same registration account information, the server may perform an operation of determining the input/output device concurrently producing a response to the information received first. As another example, upon receiving information related to reception of a wake-up command from each of multiple electronic devices including the same registration account information, the server may perform an operation of producing a response to the information received first and then determining the input/output device.

Figure 17:
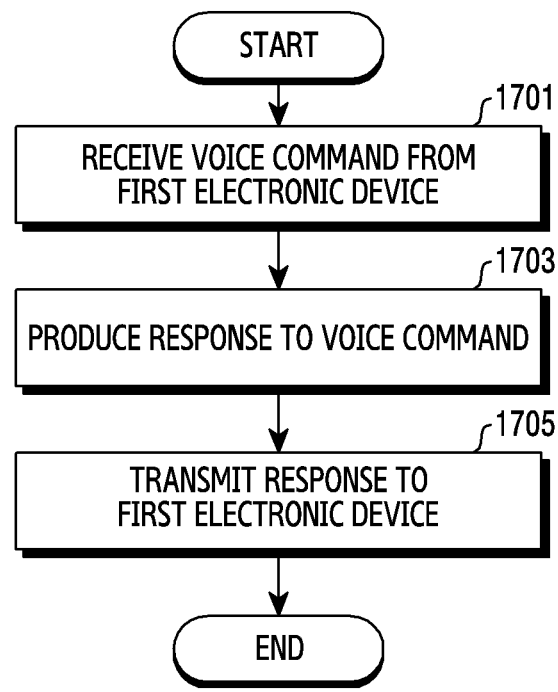
FIG. 17 is a flowchart for describing a method for processing a voice command in connection with a server according to various embodiments of the disclosure.

FIG. 17 is a flowchart for describing a method for processing a voice command in connection with a server according to various embodiments of the disclosure.

Referring to FIG. 17, in operation 1701, the processor (for example, processor 1101) of the server (for example, server 920) may receive a voice command from an electronic device through the communication circuit (for example, communication circuit 1103). For example, when the first electronic device among multiple electronic devices has been determined as the input/output device, as in the case of FIG. 15, the processor may receive a voice command spoken by the user from the first electronic device.

In operation 1703, the processor may produce a response to the voice command. For example, upon receiving a voice command asking about today's weather (for example, "How is the weather today?") from the first electronic device, the processor may acquire information related to today's weather (for example, sunny) from an external electronic device through the communication circuit. Based on the acquired information, the processor may produce a response to be transmitted to the first electronic device (for example, "It is sunny today"). As another example, upon receiving a voice command requesting playback of specific media information (for example, "Play latest popular songs"), the processor may acquire specific media information from an external electronic device through the communication circuit. Based on the acquired information, the processor may produce a response (for example, specific media information) to be transmitted to the first electronic device. According to an embodiment, upon receiving a voice command requesting playback of specific media information, the processor may transmit a signal requesting transmission of the specific media information to the first electronic device to an external electronic device having the specific media information stored therein through the communication circuit, instead of producing a response to be transmitted to the first electronic device.

In operation 1705, the processor may transmit the produced response to the electronic device through the communication circuit. In this case, the electronic device may produce a response (for example, second audio signal) to the voice command based on the response received from the server, and may output the same through the audio output interface connected to the electronic device. Accordingly, the user of the electronic device may be provided with a voice command service.

Figure 18:
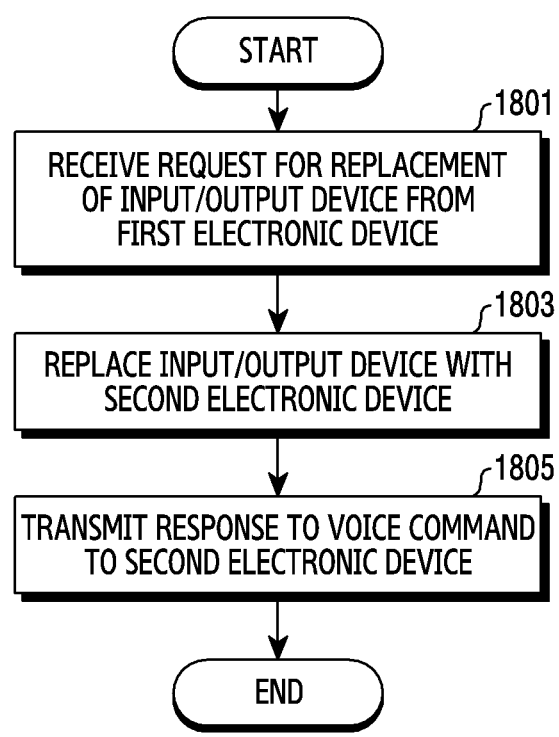
FIG. 18 is a flowchart for describing a method for replacing the input/output device to process a voice command in connection with a server according to various embodiments of the disclosure.

FIG. 18 is a flowchart for describing a method for replacing the input/output device to process a voice command in connection with a server according to various embodiments of the disclosure.

Referring to FIG. 18, in operation 1801, the processor (for example, processor 1101) of the server (for example, server 920) may receive a request for replacement of the input/output device from the first electronic device (for example, electronic device 910) through the communication circuit (for example, communication circuit 1103). For example, when the first electronic device is in a state in which the same cannot provide the user with a voice recognition service, the processor may receive a signal requesting replacement of the input/output device from the first electronic device through the communication circuit. The state in which the voice recognition service cannot be provided to the user may include at least one of a state in which the audio output device connected to the first electronic device outputs an audio signal with a level of loudness too low to be heard by a person, a state in which the audio output device connected to the first electronic device is powered off, or a state in which the first electronic device and the audio output device are disconnected. After transmitting a request for replacement of the input/output device, the first electronic device may switch to a sleep mode.

In operation 1803, the processor may replace the input/output device with the second electronic device. For example, the processor may replace the input/output device with an electronic device other than the first electronic device, among multiple electronic devices that transmitted information related to a wake-up command. The multiple electronic devices may have been registered with the same registration account. According to an embodiment, the processor may replace the input/output device with a second electronic device that received a wake-up command having the best quality (for example, loudness, degree of matching, or the like) among the multiple electronic devices other than the first electronic device. According to an embodiment, the processor may replace the input/output device with a second electronic device connected to an audio output device having the best performance among the multiple electronic devices other than the first electronic device. For example, the processor may acquire information regarding the audio output device connected to each electronic device from information related to a wake-up command received from each of the multiple electronic devices. Based on the information regarding the audio output device, the processor may replace the input/output device with the second electronic device.

In operation 1805, the processor may transmit a response to the voice command to the second electronic device through the communication circuit. In this case, the second electronic device may produce a second audio signal based on the response to the voice command, and may output the produced second audio signal through the audio output device connected to the second electronic device, or through the audio output device included in the second electronic device. Accordingly, the user may use a voice recognition service through the second electronic device even if the voice recognition service is unavailable through the first electronic device.

Figure 19:
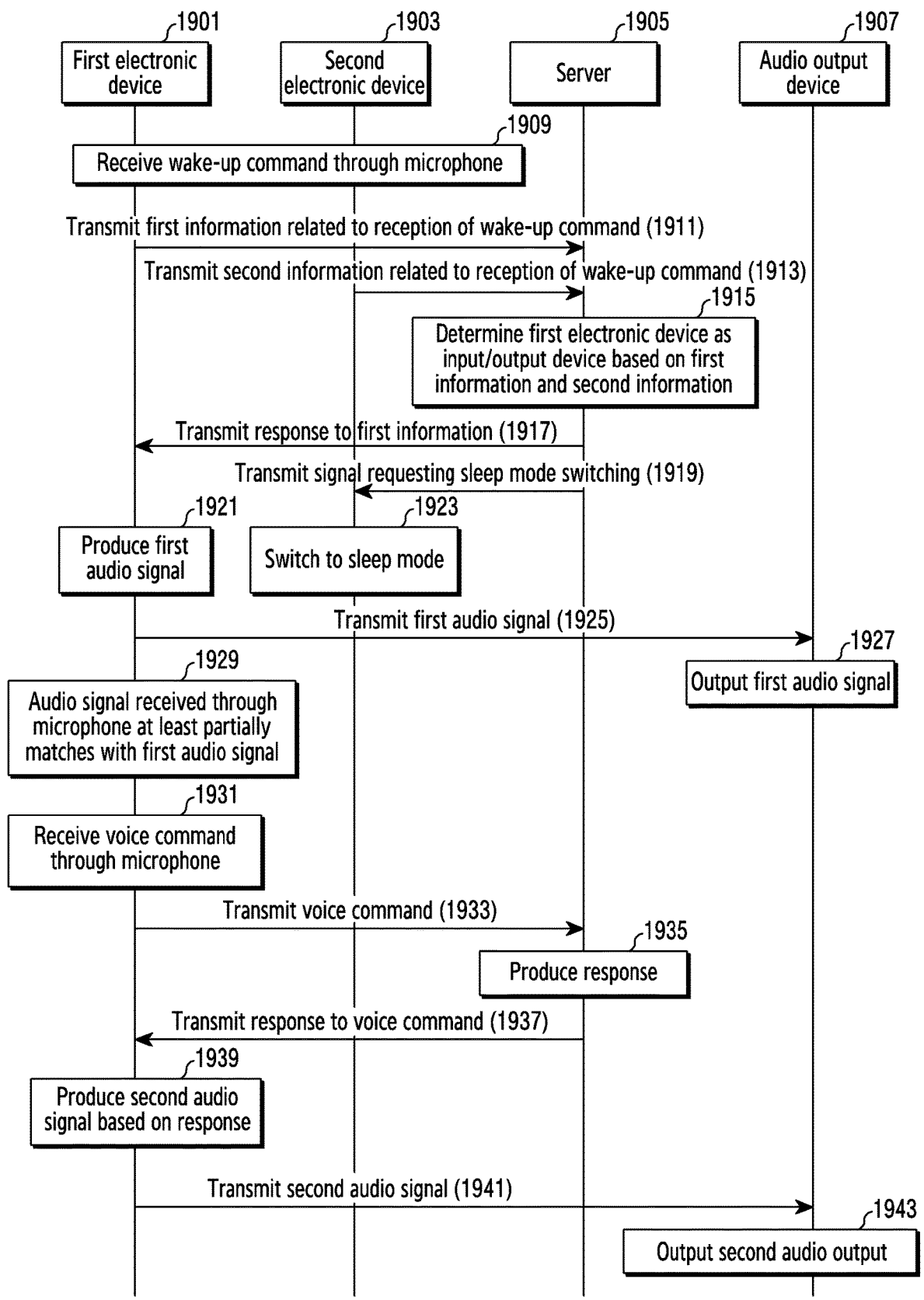
FIG. 19 is a diagram for describing an exemplary system for processing a voice command according to various embodiments of the disclosure.

FIG. 19 is a diagram for describing an exemplary system for processing a voice command according to various embodiments of the disclosure.

Referring to FIG. 19, in operation 1909, each of the first electronic device 1901 and the second electronic device 1903, operating in a sleep mode, may receive a wake-up command through the microphone. In this case, the first electronic device 1901 and the second electronic device 1903 may recognize the received wake-up command and then wake up. After waking up, each of the first electronic device 1901 and the second electronic device 1903 may produce information related to reception of the wake-up command. The first electronic device 1901 and the second electronic device 1903 may be electronic devices registered with the same registration account.

In operation 1911, the first electronic device 1901 may transmit first information related to reception of the wake-up command to the server 1905. The first information related to reception of the wake-up command may include at least some of information indicating that the wake-up command is received, information regarding the quality of the wake-up command received by the first electronic device 1901, registration account information of the first electronic device 1901, registration position information of the first electronic device 901, or information regarding the audio output device 1907 connected to the first electronic device 1901.

In operation 1913, the second electronic device 1903 may transmit second information related to reception of the wake-up command to the server 1905. The second information related to reception of the wake-up command may include at least some of information indicating that the wake-up command is received, information regarding the quality of the wake-up command received by the second electronic device 1903, registration account information of the second electronic device 1903, registration position information of the second electronic device 1903, or information regarding the audio output device connected to the second electronic device 1903 (or audio output device provided in the second electronic device 1903).

According to various embodiments, operation 1913 may be performed before operation 1911 is performed or may be performed concurrently with operation 1911.

In operation 1915, the server 1905 may determine the first electronic device 1901 as an input/output device based on the first information and the second information. For example, based on the first information and the second information, the server 1901 may identify the quality (for example, loudness, degree of matching, signal-to-noise ratio, or the like) of the wake-up command received by the first electronic device 1901 through the microphone with the quality of the wake-up command received by the second electronic device 1903 through the microphone. The server 1901 may determine the first electronic device 1901, which received a wake-up command having a better quality, as the input/output device.

In operation 1917, the server 1905 may transmit a response to the first information (information indicating selection as input/output device) to the first electronic device 1901. In operation 1919, the server 1905 may transmit a signal requesting switching to the sleep mode to the second electronic device 1903.

According to various embodiments, operation 1919 may be performed before operation 1917 is performed, or may be performed concurrently with operation 1917.

In operation 1921, the first electronic device 1901 may produce a first audio signal based on the response received from the server 1905. The first audio signal may be an audio signal of a non-language sound (or sound language).

In operation 1923, the second electronic device 1903 may switch to the sleep mode based on the signal requesting sleep mode switching received form the server 1905. According to an embodiment, the second electronic device 1903 may activate the communication circuit even when operating in the sleep mode, thereby receiving signals transmitted form the server.

In operation 1925, the first electronic device 1901 may transmit the produced first audio signal to the audio output device 1907 connected to the first electronic device 1901. The audio output device 1907 may be connected to the first electronic device 1901 in a wired or wireless manner, and may transmit information regarding the audio output device 1907 to the first electronic device 1901. According to an embodiment, if the first electronic device 1901 includes an LED, the LED may be turned on concurrently transmitting the first audio signal.

In operation 1927, the audio output device 1907 may output the first audio signal transmitted from the first electronic device 1901. In this case, the user (for example, user 910) may hear the first audio signal output by the audio output device connected to the first electronic device 1901, thereby recognizing that the first electronic device 1901 will provide a voice recognition service.

In operation 1929, the first electronic device 1901 may compare the audio signal received through the microphone for a designated period of time after the first audio signal is transmitted with the produced first audio signal, thereby confirming that the audio signal received through the microphone and the produced first audio signal at least partially match with each other. According to an embodiment, if the audio signal received through the microphone includes at least a part of the produced first audio signal, the first electronic device 1901 may transmit information regarding the same (or information indicating that the first electronic device 1901 has been activated) to the server.

In operation 1931, the first electronic device 1901 may receive a voice command through the microphone. For example, the first electronic device 1901 may receive a voice command spoken by the user, such as "How is the weather today?", through the microphone.

In operation 1933, the first electronic device 1901 may transmit the voice command received through the microphone to the server 1905.

In operation 1935, the server 1905 may produce a response to the voice command received from the first electronic device 1901. For example, the server 1905 may acquire information regarding today's weather form an external electronic device. The server 1905 may produce a response to the voice command based on the acquired information. According to an embodiment, the response to the voice command may be produced in various formats. For example, if the first electronic device 1901 includes a display or is connected to a separate display device besides the audio output device 1907, the response may be produced as a notification message.

In operation 1937, the first electronic device 1901 may produce a second audio signal based on the response to the voice command received from the server 1905. For example, the first electronic device 1901 may produce an audio signal of a language sound, such as "It is sunny today", based on the response to the voice command received from the server 1901. As another example, the first electronic device 1901 may produce an audio signal of a non-language sound, such as classical music, based on the response to the voice command received from the server 1901.

In operation 1939, the first electronic device 1901 may transmit the produced second audio signal to the audio output device 1907 connected to the first electronic device 1901.

In operation 1941, the audio output device 1907 may output the second audio signal received from the first electronic device 1901. For example, the audio output device 1907 may output "It is sunny today". Accordingly, the user may hear a sound corresponding to information regarding today's weather.

Figure 20:
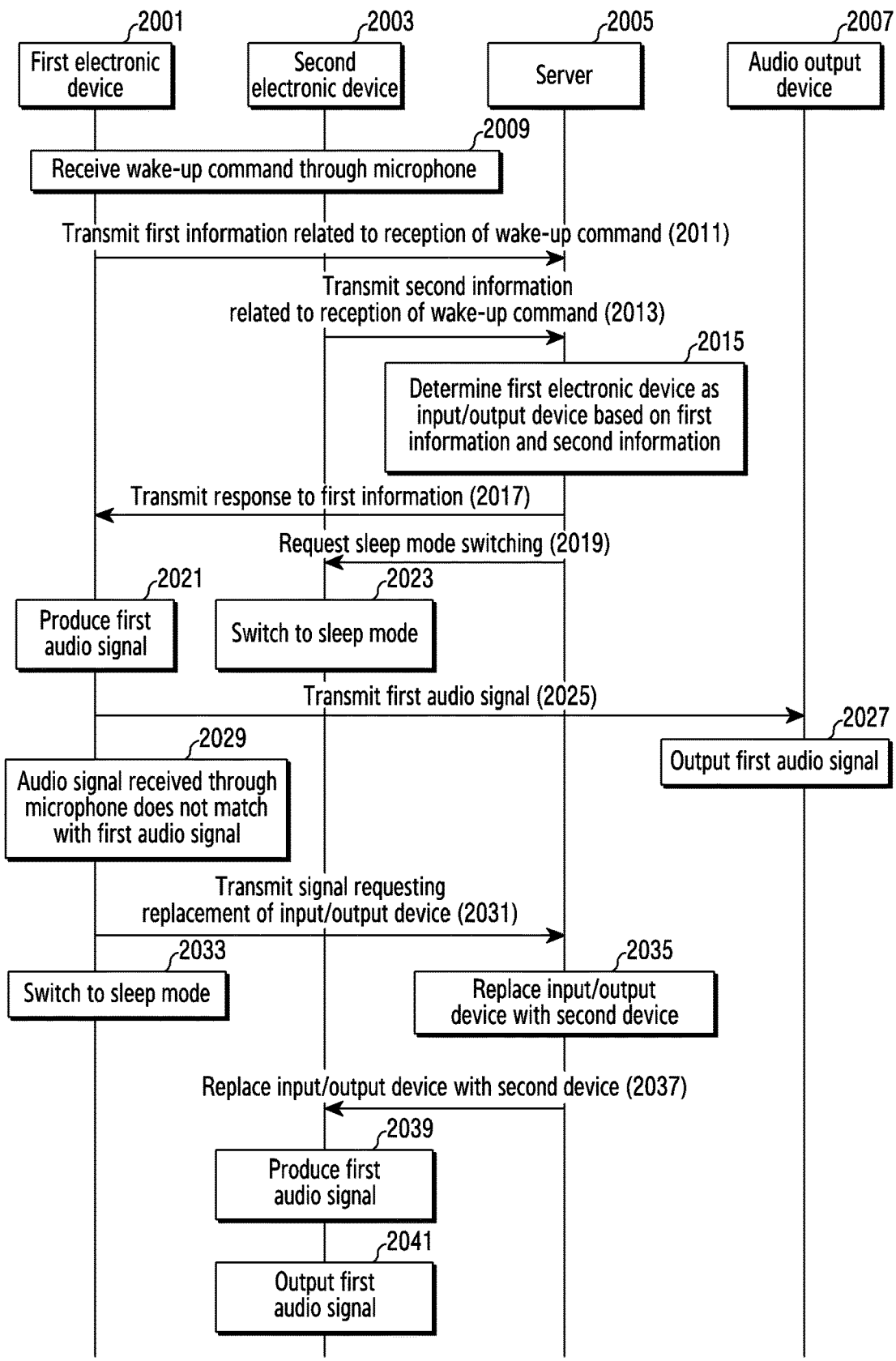
FIG. 20 is another diagram for describing an exemplary system for processing a voice command according to various embodiments of the disclosure.

FIG. 20 is another diagram for describing an exemplary system for processing a voice command according to various embodiments of the disclosure.

Referring to FIG. 20, in operation 2009, each of the first electronic device 2001 and the second electronic device 2003, operating in a sleep mode, may receive a wake-up command through the microphone. Each of the first electronic device 2001 and the second electronic device 2003 may wake up in response to receiving the wake-up command. After waking up, each of the first electronic device 2001 and the second electronic device 2003 may produce information related to reception of the wake-up command. The first electronic device 2001 and the second electronic device 2003 may be electronic devices registered with the same registration account.

In operation 2011, the first electronic device 2001 may transmit first information related to reception of the wake-up command to the server 2005. For example, the first electronic device 2001 may transmit, to the server 2005, at least some of information indicating that the wake-up command is received, information regarding the quality of the wake-up command received by the first electronic device 2001, registration account information of the first electronic device 2001, registration position information of the first electronic device 2001, or information regarding the audio output device 2007 connected to the first electronic device 2001.

In operation 2013, the second electronic device 2003 may transmit second information related to reception of the wake-up command to the server 2005. For example, the second electronic device 2003 may transmit, to the server 2005, at least some of information indicating that the wake-up command is received, information regarding the quality of the wake-up command received by the second electronic device 2003, registration account information of the second electronic device 2003, registration position information of the second electronic device 2003, or information regarding the audio output device 2007 connected to the second electronic device 2003.

According to various embodiments, operation 2013 may be performed before operation 2011 is performed or may be performed concurrently with operation 2011.

In operation 2015, the server 2005 may determine the first electronic device 2001 as an input/output device based on the first information and the second information. For example, based on the first information and the second information, the server 2005 may identify information regarding the audio output device 1907 connected to the first electronic device 2001 and information regarding the audio output device (not illustrated) connected to the second electronic device 2003 (or information regarding the audio output device provided in the second electronic device 1901). Based on the identified information, the server 2005 may determine the first electronic device 2001, which is connected to the audio output device having a better performance, as the input/output device.

In operation 2017, the server 2005 may transmit a response to the first information to the first electronic device 2001. In operation 2019, the server 2005 may transmit a signal requesting switching to the sleep mode to the second electronic device 2003. The response to the first information may include indicating that the first electronic device 2001 is selected as the input/output device.

According to various embodiments, operation 2019 may be performed before operation 2017 is performed, or may be performed concurrently with operation 2017.

In operation 2021, the first electronic device 2001 may produce a first audio signal based on the response received from the server 2005. For example, the first electronic device 2001 may produce an audio signal of a non-language sound (or sound language) indicating that the first electronic device 2001 is selected as an input/output device.

In operation 2023, the second electronic device 2093 may switch to the sleep mode based on the signal requesting sleep mode switching received form the server 2005. The second electronic device 2093 may receive signals from the server even while operating in the sleep mode.

In operation 2025, the first electronic device 2001 may transmit the produced first audio signal to the audio output device 2007 connected to the first electronic device 2001. The audio output device 2007 may be connected to the first electronic device 2001 in a wired or wireless manner. According to an embodiment, when connected to the first electronic device 2001 in a wired or wireless manner, the audio output device 2007 may provide information regarding the audio output device 2007 (for example, information regarding the performance of the audio output device 2007) to the first electronic device 2001. According to an embodiment, if the first electronic device 2001 includes an LED, the LED may be turned on concurrently with transmitting the first audio signal.

In operation 2027, the audio output device 2007 may output the first audio signal.

In operation 2029, the first electronic device 2001 may compare the audio signal received through the microphone for a designated period of time after the first audio signal is transmitted with the produced first audio signal, thereby confirming that the audio signal received through the microphone and the produced first audio signal do not match with each other.

In operation 2031, the first electronic device 2001 may transmit a signal requesting replacement of the input/output device to the server 2005, and may switch to the sleep mode in operation 2033.

In operation 2035, the server 2005 may replace the input/output device with the second electronic device 2003 in response to receiving the signal requesting replacement of the input/output device from the first electronic device 2001, and may transmit a response to the second information to the second electronic device 2003 in operation 2037. The response to the second information may be the same information as the response to the first information.

In operation 2039, the second electronic device 2003 may produce a first audio signal based on the response to the second information from the server 2007. For example, the second electronic device 2003 may wake up upon receiving the response to the second information from the server 2007. The second electronic device 2003 may produce a first audio signal of a non-language sound (or language sound) based on the received response.

In operation 2041, the second electronic device 2003 may output the produced first audio signal. For example, the second electronic device 2003 may output the first audio signal through the audio output device (not illustrated) connected to the second electronic device 2003 or the audio output device provided in the second electronic device 2003. After performing operation 2039 of outputting the first audio signal, the second electronic device 2003 may perform operations of receiving and processing the user's voice command while interworking with the server (for example, operation 1931 to operation 1939 in FIG. 19), thereby providing the user with a voice recognition service. Accordingly, the user may be provided with a voice recognition service through the second electronic device 2003 even if no voice recognition service is provided from the first electronic device 2001 determined as the input/output device.

According to various embodiments of the disclosure, a method for operating an electronic device (for example, electronic device 910) may include the operations of: receiving a wake-up command through a microphone of the electronic device; recognizing the wake-up command; transmitting information related to reception of the wake-up command to a server through a communication circuit of the electronic device; receiving a response from the server through the communication circuit; producing, based on the response, a first audio signal; and outputting the first audio signal through an audio output interface of the electronic device while the microphone is available. The audio signal may be a non-language sound.

According to various embodiments of the disclosure, the method for operating an electronic device may further include the operations of: receiving a non-language sound through the microphone after the first audio signal is output; determining whether or not the non-language sound and the first audio signal at least partially match with each other; and transmitting information regarding the determination to the server through the communication circuit.

According to various embodiments of the disclosure, the information related to reception of the wake-up command may include information indicating that the wake-up command is received and information regarding quality of the wake-up command.

According to various embodiments of the disclosure, the information regarding quality of the wake-up command may include at least one of loudness of the wake-up command received through the microphone, degree of matching between the wake-up command received through the microphone and a wake-up command prestored in a memory of the electronic device, and a signal-to-noise ratio between the wake-up command received through the microphone and an audio signal received through the microphone before or after reception of the wake-up command.

According to various embodiments of the disclosure, the information related to reception the wake-up command may further include at least one of identification information of the electronic device through the communication circuit, registration account information of the electronic device, registration position information of the electronic device, and information regarding an audio output device connected to the electronic device.

According to various embodiments of the disclosure, the method for operating an electronic device may further include the operations of: receiving a voice command through the microphone; transmitting the voice command to the server through the communication circuit; producing a second audio signal based on the response, if a response to the voice command has been received from the server through the communication circuit; and outputting the second audio signal through the audio output interface. The second audio signal may be a non-language sound or a language sound.

According to various embodiments of the disclosure, the method for operating an electronic device may further include the operations of: outputting a third audio signal indicating that information related to the voice command cannot be provided through the audio output interface, if no response to the voice command is received from the server. The third audio signal may be an audio signal prestored in the memory of the electronic device.

According to various embodiments, the electronic device may be connected to the audio output device through the audio output interface. The method for operating an electronic device may further include the operations of: transmitting information indicating disconnection from the audio output device to the server through the communication circuit, if the electronic device and the audio output device are disconnected; and switching the operating mode of the electronic device to a sleep mode.

According to various embodiments of the disclosure, a method for operating a server may include the operations of: receiving information related to reception of a wake-up command from each of multiple electronic devices through a communication circuit of the server; determining a first electronic device among the multiple electronic devices as an input/output device based on the information; producing a response to the information; and transmitting the response to the first electronic device through the communication circuit. The information may include information indicating that the wake-up command is received and information indicating quality of the wake-up command.

According to various embodiments, the information indicating quality of the wake-up command may include at least one of loudness of the wake-up command received through the microphone of the electronic device, degree of matching between the wake-up command received through the microphone of the electronic device and a wake-up command prestored in the electronic device, or a signal-to-noise ratio between the wake-up command received through the microphone of the electronic device and an audio signal received before or after reception of the wake-up command.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, modifications and changes may be made thereto without departing from the scope of the disclosure. Therefore, the scope of the disclosure should not be defined as being limited to the embodiments, but should be defined by the appended claims and equivalents thereof.

The invention claimed is:

1. An electronic device comprising:
a housing comprising a circular upper end surface comprising multiple openings, a flat circular lower end surface, and a side surface surrounding a space between the upper end surface and the lower end surface;
an audio output interface formed on the side surface and to be connected to an audio output device in a wired or wireless manner;
a power input interface formed on the side surface;
a microphone positioned inside the housing so as to face the openings;
a communication circuit;
a processor operatively connected to the audio output interface, the power input interface, the microphone, and the communication circuit; and
a memory operatively connected to the processor, wherein the memory is configured to store instructions that, when executed, cause the processor to:
receive a wake-up command through the microphone;
recognize the wake-up command;
transmit first information related to reception of the wake-up command to a server through the communication circuit, wherein the first information includes a position information of the electronic device;
when the position information of the electronic device included the first information matches to a registration position information of the electronic device, receive a response from the server through the communication circuit, wherein the response includes information indicating that the electronic device is determined as a voice command processing device;
produce, based on the response, a first audio signal for outputting a sound through the audio output device;
transmit the first audio signal to the audio output device through the audio output interface so that the sound is output from the audio output device, while the microphone is available,
receive the sound for a designated period of time through the microphone after the first audio signal is transmitted;
identify a degree of matching between a second audio signal produced based on the sound received through the microphone and the first audio signal transmitted from the electronic device to the audio output device, in order to determine whether or not the audio output device normally outputs the first audio signal;
transmit information regarding the degree of matching to the server through the communication circuit;
when the second audio signal matches the first audio signal, output the second audio signal through the audio output device; and
when the second audio signal does not match the first audio signal, transmit a signal requesting replacement of the voice command processing device to the server from the electronic device to another electronic, and the electronic device switches to a sleep mode.

2. The electronic device as claimed in claim 1, wherein the first audio signal is a non-language sound.

3. The electronic device as claimed in claim 1, wherein the information related to reception of the wake-up command comprises information indicating that the wake-up command is received and information regarding quality of the wake-up command.

4. The electronic device as claimed in claim 3, wherein the information regarding quality of the wake-up command comprises at least one of loudness of the wake-up command received through the microphone, degree of matching between the wake-up command received through the microphone and a wake-up command prestored in the memory, and a signal-to-noise ratio between the wake-up command received through the microphone and an audio signal received through the microphone before or after reception of the wake-up command.

5. The electronic device as claimed in claim 3, wherein the information related to reception of the wake-up command further comprises at least one of identification information of the electronic device through the communication circuit, registration account information of the electronic device, and information regarding the audio output device connected to the electronic device.

6. The electronic device as claimed in claim 1, wherein the instructions are configured to cause the processor to:
receive a voice command through the microphone;
transmit the voice command to the server through the communication circuit;
produce a third audio signal, when a response to the voice command is received from the server through the communication circuit, based on the response; and
output the third audio signal through the audio output interface, and
wherein the third audio signal is a non-language sound or a language sound.

7. The electronic device as claimed in claim 6, wherein the instructions are configured to cause the processor to output a fourth audio signal through the audio output interface, when no response to the voice command is received from the server, so as to inform that information regarding the voice command cannot be provided, and
wherein the fourth audio signal is an audio signal prestored in the memory.

8. The electronic device as claimed in claim 6, wherein the instructions are configured to cause the processor to:
transmit, when the electronic device and the audio output device are disconnected, information indicating disconnection from the audio output device and a signal requesting a change of an input/output device to the server through the communication circuit; and
switch an operating mode of the electronic device to the sleep mode.

9. A method for operating an electronic device, the method comprising:
receiving a wake-up command through a microphone of the electronic device;
recognizing the wake-up command;
transmitting first information related to reception of the wake-up command to a server through a communication circuit of the electronic device, wherein the first information includes a position information of the electronic device;
when the position information of the electronic device included the first information matches to a registration position information of the electronic device, receiving a response from the server through the communication circuit, wherein the response includes information indicating that the electronic device is determined as a voice command processing device;
producing, based on the response, a first audio signal for outputting a sound through an audio output device;
transmitting the first audio signal to an audio output device through an audio output interface of the electronic device so that the sound is output from the audio output device, while the microphone is available;
receiving the sound for a designated period of time through the microphone after the first audio signal is transmitted;
identifying a degree of matching between a second audio signal produced based on the sound received through the microphone and the first audio signal transmitted from the electronic device to the audio output device, in order to determine whether or not the audio output device normally outputs the first audio signal;
transmitting information regarding the degree of matching to the server through the communication circuit;
when the second audio signal matches the first audio signal, outputting the second audio signal through the audio output device; and
when the second audio signal does not match the first audio signal, transmitting a signal requesting replacement of the voice command processing device to the server from the electronic device to another electronic, and switching to a sleep mode.

10. The method as claimed in claim 9, wherein the first audio signal is a non-language sound.

11. The method as claimed in claim 9, wherein the information related to reception of the wake-up command comprises information indicating that the wake-up command is received and information regarding quality of the wake-up command.

12. The method as claimed in claim 11, wherein the information regarding quality of the wake-up command comprises at least one of loudness of the wake-up command received through the microphone, degree of matching between the wake-up command received through the microphone and a wake-up command prestored in a memory of the electronic device, and a signal-to-noise ratio between the wake-up command received through the microphone and an audio signal received through the microphone before or after reception of the wake-up command.

13. The method as claimed in claim 11, wherein the information related to reception of the wake-up command further comprises at least one of identification information of the electronic device through the communication circuit, registration account information of the electronic device, and information regarding the audio output device connected to the electronic device.

14. The method as claimed in claim 9, further comprising:
receiving a voice command through the microphone;
transmitting the voice command to the server through the communication circuit;
producing a third audio signal based on the response, if a response to the voice command has been received from the server through the communication circuit; and
outputting the third audio signal through the audio output interface, and
wherein the third audio signal is a non-language sound or a language sound.

15. The method as claimed in claim 14, further comprising:
outputting a fourth audio signal indicating that information related to the voice command cannot be provided through the audio output interface, if no response to the voice command is received from the server, and
wherein the fourth audio signal is an audio signal prestored in a memory of the electronic device.

16. The method as claimed in claim 14, wherein the electronic device is connected to the audio output device through the audio output interface, further comprising:
transmitting information indicating disconnection from the audio output device to the server through the communication circuit, if the electronic device and the audio output device are disconnected;
and switching an operating mode of the electronic device to the sleep mode.

* * * * *